United States Patent
Su et al.

(10) Patent No.: US 12,232,127 B2
(45) Date of Patent: Feb. 18, 2025

(54) METHOD AND APPARATUS FOR INDICATING TCI, BASE STATION AND STORAGE MEDIUM

(71) Applicant: DATANG MOBILE COMMUNICATIONS EQUIPMENT CO., LTD., Beijing (CN)

(72) Inventors: Xin Su, Beijing (CN); Qiubin Gao, Beijing (CN); Runhua Chen, Beijing (CN); Mengjun Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 714 days.

(21) Appl. No.: 17/600,605

(22) PCT Filed: Jan. 10, 2020

(86) PCT No.: PCT/CN2020/071549
§ 371 (c)(1),
(2) Date: Oct. 1, 2021

(87) PCT Pub. No.: WO2020/199717
PCT Pub. Date: Oct. 8, 2020

(65) Prior Publication Data
US 2022/0201663 A1    Jun. 23, 2022

(30) Foreign Application Priority Data
Apr. 4, 2019  (CN) .................. 201910270885.X

(51) Int. Cl.
*H04W 72/23* (2023.01)
*H04L 5/00* (2006.01)

(52) U.S. Cl.
CPC .......... *H04W 72/23* (2023.01); *H04L 5/0053* (2013.01)

(58) Field of Classification Search
CPC ........................... H04W 72/23; H04L 5/0053
(Continued)

(56) References Cited

U.S. PATENT DOCUMENTS

2018/0278395 A1   9/2018   Yoon
2018/0373847 A1   12/2018  Lo et al.
(Continued)

FOREIGN PATENT DOCUMENTS

CA     3045196 A1    5/2011
CN    102158302 A    8/2011
(Continued)

OTHER PUBLICATIONS

Huawei et al., "Summary of AI: 7.2.8.2 Enhancements on Multi-TRP/Panel Transmission of Offline Discussion", 3GPP TSG RAN WG1 Ad-Hoc Meeting 1901, Taipei, Jan. 21-25, 2019, total 39 pages, R1-1901371.
(Continued)

*Primary Examiner* — Christopher R Crompton
(74) *Attorney, Agent, or Firm* — Kilpatrick Townsend & Stockton LLP

(57) ABSTRACT

Disclosed in the present application are a method and apparatus for indicating TCI, a base station, and a storage medium. The method includes: when TCI in DCI configured by a base station for a UE corresponds to at least two TCI states, indicating a correspondence between a CDM group and a TCI state by mean of the DCI, and the CDM group is a CDM group to which a DMRS port allocated by the base station for the UE belongs.

3 Claims, 5 Drawing Sheets

(58) Field of Classification Search
USPC .......................................................... 370/335
See application file for complete search history.

(56) References Cited

U.S. PATENT DOCUMENTS

| | | | | |
|---|---|---|---|---|
| 2019/0342907 | A1* | 11/2019 | Huang | H04W 72/23 |
| 2019/0379506 | A1* | 12/2019 | Cheng | H04W 88/06 |
| 2020/0313947 | A1* | 10/2020 | Noh | H04B 7/0628 |

FOREIGN PATENT DOCUMENTS

| | | | |
|---|---|---|---|
| CN | 102868430 | A | 1/2013 |
| CN | 109391456 | A | 2/2019 |
| WO | 2020164133 | A1 | 8/2020 |

OTHER PUBLICATIONS

CATT,"Consideration on multi-TRP/panel transmission", 3GPP TSG RAN WG1 #96bis, Xi'an, China, Apr. 8-12, 2019, total 14 pages, R1-1904561.

Huawei et al., "Summary of AI: 7.2.8.2 Enhancements on Multi-TRP/Panel Transmissionof Offline Discussion", 3GPP TSG RAN WG1 Meeting #95, Spokane, USA, Nov. 12-16, 2018, total 32 pages, R1-18abcde.

Huawei et al., "Summary of AI: 7.2.8.2 Enhancements on Multi-TRP/Panel Transmission of Offline Discussion", 3GPP TSG RAN WG1 Meeting #96, Athens, Greece, Feb. 25-Mar. 1, 2019, total 8 pages, R1-190abcd.

Ericsson, "On multi-TRP and multi-panel", 3GPP TSG RAN WG1 Meeting RAN1#96 bis, Xi'an, China, Apr. 8-12, 2019, total 19 pages, R1-1905513.

Huawei et al., "Enhancements on Multi-TRP/panel transmission", 3GPP TSG RAN WG1 Meeting #96bis, Xi'an, China, Apr. 8-12, 2019, total 22 pages, R1-1905523.

* cited by examiner

METHOD AND APPARATUS FOR INDICATING TCI, BASE STATION AND STORAGE MEDIUM

CROSS-REFERENCES TO RELATED APPLICATIONS

The present application is a US National Stage of International Application No. PCT/CN2020/071549, filed on Jan. 10, 2020, which claims priority to Chinese Patent Application No. 201910270885.X, entitled "Method and Apparatus for Indicating TCI, Base Station and Storage Medium", filed in the Chinese Patent Office on Apr. 4, 2019, the entire contents of which are incorporated herein by reference.

FIELD

The present application relates to the field of communication, in particular to a method and apparatus for indicating transmission configuration indication (TCI), a base station and a storage medium.

BACKGROUND

With the continuous development of communication technologies, people have put forward higher requirements for communication quality. In order to improve the signal quality at the edge of a serving cell and provide more balanced services in the server cell, a coordinated multiple point transmission (CoMP) technology is still an important technical means in a new radio (NR) system. From the perspective of network morphology, the CoMP technology uses a large number of distributed access points and baseband centralized processing for network deployment, which will be more conducive to providing a balanced user experience rate, significantly reducing the delay and signaling overhead caused by handover, and improving the communication quality.

According to a mapping relationship of transmitted signal streams to multiple access points, the access points may be transmission reception points (TRPs) or antenna panels, and the CoMP technology may be divided into two types: coherent transmission and non-coherent transmission. In non-coherent transmission, each data stream is mapped only to part of the access points. Compared with coherent transmission, non-coherent transmission requires less synchronization between the access points and the lower transmission capability of a backhaul link, and is insensitive to many non-ideal factors in actual deployment conditions, so it is an important consideration of the CoMP technology. A non-coherent joint transmission (NC-JT) technology is currently being studied in Rel-16.

The NC-JT may adopt a mode that a single physical downlink control channel (PDCCH) schedules a single physical downlink shared channel (PDSCH) (referred to as a single-PDCCH mode), or may adopt a mode that multiple PDCCHs schedule corresponding PDSCHs (referred to as a multi-PDCCH mode). For the single-PDCCH mode, demodulation reference signal (DMRS) ports need to be subjected to code division multiplexing (CDM) grouping according to the quasi co-located (QCL) relationship, and DMRS ports in the same CDM group are QCL, i.e. different QCL information is indicated by different CDM groups. In order to realize QCL indication, in the NC-JT, a TCI information field in downlink control information (DCI) corresponds to one or two transmission configuration indication states (TCI states), and the TCI state contains one or multiple reference signals for QCL reference. However, when the TCI information field corresponds to two TCI states in the prior art, there is no solution to determine the corresponding relationship between each CDM group to which DMRS ports belong and the TCI state, to affect the flexibility of NC-JT. Therefore, there is an urgent need for a solution that can flexibly indicate that each CDM group to which the DMRS ports belong corresponds to the TCI state when the TCI information field corresponds to two TCI states.

SUMMARY

The present application provides a method and apparatus for indicating TCI, a base station and a storage medium, to flexibly indicate a TCI state corresponding to each CDM group to which DMRS ports belong.

In one embodiment, the present application discloses a method for indicating TCI, applied to a base station, and including:

indicating, by DCI, a corresponding relationship between a CDM group and TCI states, when TCI in the DCI configured for a user equipment (UE) corresponds to at least two TCI states, where the CDM group is a CDM group to which DMRS ports allocated by the base station for the UE belong.

In one embodiment, if the DMRS ports allocated for the UE conform to a DMRS pilot type 1, and the TCI corresponds to two TCI states, the indicating, by the DCI, the corresponding relationship between the CDM group and the TCI states, includes one of:

indicating, by first indication information in the DCI, that the CDM group to which the DMRS ports allocated for the UE belong corresponds to a first TCI state of the two TCI states;

indicating, by second indication information in the DCI, that the CDM group to which the DMRS ports allocated for the UE belong corresponds to a second TCI state of the two TCI states;

indicating, by third indication information in the DCI, that a first CDM group to which the DMRS ports allocated for the UE belong corresponds to the first TCI state of the two TCI states, and a second CDM group to which the DMRS ports belong corresponds to the second TCI state of the two TCI states; or indicating, by fourth indication information in the DCI, that the first CDM group to which the DMRS ports allocated for the UE belong corresponds to the second TCI state of the two TCI states, and the second CDM group to which the DMRS ports belong corresponds to the first TCI state of the two TCI states.

In one embodiment, if the DMRS ports allocated for the UE conform to a DMRS pilot type 1, and the TCI corresponds to two TCI states, the indicating, by the DCI, the corresponding relationship between the CDM group and the TCI states, includes one of:

indicating, by fifth indication information in the DCI, that if the DMRS ports allocated for the UE belong to one CDM group, the one CDM group corresponds to a first TCI state of the two TCI states, and if the DMRS ports allocated for the UE belong to two CDM groups, a first CDM group to which the DMRS ports belong corresponds to the first TCI state of the two TCI states, and a second CDM group to which the DMRS ports belong corresponds to a second TCI state of the two TCI states; or indicating, by sixth indication information in the DCI, that if the DMRS ports allocated for the UE belong to one CDM group, the one CDM group corresponds to the second TCI state of the two TCI states, and if the DMRS ports allocated for the UE belong to two CDM groups, the first CDM group to which the DMRS ports belong corresponds to the second TCI state of the two TCI states, and the second CDM group to which the DMRS ports belong corresponds to the first TCI state of the two TCI states.

In one embodiment, if the DMRS ports allocated for the UE conform to a DMRS pilot type 2, and the TCI corresponds to two TCI states, the indicating, by the DCI, the corresponding relationship between the CDM group and the TCI states, includes one of:

indicating, by seventh indication information in the DCI, that the CDM group to which the DMRS ports allocated for the UE belong corresponds to a first TCI state of the two TCI states;

indicating, by eighth indication information in the DCI, that the CDM group to which the DMRS ports allocated for the UE belong corresponds to a second TCI state of the two TCI states;

indicating, by ninth indication information in the DCI, that a first CDM group to which the DMRS ports allocated for the UE belong corresponds to the first TCI state of the two TCI states, and other CDM groups to which the DMRS ports belong correspond to the second TCI state of the two TCI states;

indicating, by tenth indication information in the DCI, that the first CDM group to which the DMRS ports allocated for the UE belong corresponds to the second TCI state of the two TCI states, and other CDM groups to which the DMRS ports belong correspond to the first TCI state of the two TCI states;

indicating, by eleventh indication information in the DCI, that a second CDM group to which the DMRS ports allocated for the UE belong corresponds to the first TCI state of the two TCI states, and other CDM groups to which the DMRS ports belong correspond to the second TCI state of the two TCI states;

indicating, by twelfth indication information in the DCI, that the second CDM group to which the DMRS ports allocated for the UE belong corresponds to the second TCI state of the two TCI states, and other CDM groups to which the DMRS ports belong correspond to the first TCI state of the two TCI states;

indicating, by thirteenth indication information in the DCI, that a third CDM group to which the DMRS ports allocated for the UE belong corresponds to the first TCI state of the two TCI states, and other CDM groups to which the DMRS ports belong correspond to the second TCI state of the two TCI states; or indicating, by fourteenth indication information in the DCI, that the third CDM group to which the DMRS ports allocated for the UE belong corresponds to the second TCI state of the two TCI states, and other CDM groups to which the DMRS ports belong correspond to the first TCI state of the two TCI states.

In one embodiment, if the DMRS ports allocated for the UE conform to a DMRS pilot type 2, and the TCI corresponds to two TCI states, the indicating, by the DCI, the corresponding relationship between the CDM group and the TCI states, includes one of:

indicating, by fifteenth indication information in the DCI, that if the DMRS ports allocated for the UE belong to one CDM group, the one CDM group corresponds to a first TCI state of the two TCI states, and if the DMRS ports allocated for the UE belong to at least two CDM groups containing a first CDM group, the first CDM group to which the DMRS ports belong corresponds to the first TCI state of the two TCI states, and other CDM groups to which the DMRS ports belong correspond to a second TCI state of the two TCI states;

indicating, by sixteenth indication information in the DCI, that if the DMRS ports allocated for the UE belong to one CDM group, the one CDM group corresponds to the second TCI state of the two TCI states, and if the DMRS ports allocated for the UE belong to at least two CDM groups containing the first CDM group, the first CDM group to which the DMRS ports belong corresponds to the second TCI state of the two TCI states, and other CDM groups to which the DMRS ports belong correspond to the first TCI state of the two TCI states;

indicating, by seventeenth indication information in the DCI, that a second CDM group to which the DMRS ports allocated for the UE belong corresponds to the first TCI state of the two TCI states, and other CDM groups to which the DMRS ports belong correspond to the second TCI state of the two TCI states;

indicating, by eighteenth indication information in the DCI, that the second CDM group to which the DMRS ports allocated for the UE belong corresponds to the second TCI state of the two TCI states, and other CDM groups to which the DMRS ports belong correspond to the first TCI state of the two TCI states;

indicating, by nineteenth indication information in the DCI, that a third CDM group to which the DMRS ports allocated for the UE belong corresponds to the first TCI state of the two TCI states, and other CDM groups to which the DMRS ports belong correspond to the second TCI state of the two TCI states; or indicating, by twentieth indication information in the DCI, that the third CDM group to which the DMRS ports allocated for the UE belong corresponds to the second TCI state of the two TCI states, and other CDM groups to which the DMRS ports belong correspond to the first TCI state of the two TCI states.

In another embodiment, the present application discloses an apparatus for indicating TCI, applied to a base station, and including:

a determining device, configured to determine whether TCI in DCI configured for a UE corresponds to at least two TCI states; and a processing device, configured to indicate, by the DCI, a corresponding relationship between a CDM group and the TCI states, when a determination result of the determining device is yes; where the CDM group is a CDM group to which DMRS ports allocated by the base station for the UE belong.

In yet another embodiment, the present application discloses a base station, including a processor and a memory; where the memory is configured to store a computer instruction; and the processor is configured to run the computer instruction to implement the method in the above embodiments.

In one embodiment, the present application discloses a computer readable storage medium, where the storage medium stores a computer instruction, and the computer instruction implements the method in the above embodiments when being executed by a processor of a base station.

The present application has the following beneficial effects: a separate information field is introduced in the DCI, and when the TCI in the DCI configured for the UE corresponds to at least two TCI states, according to the corresponding relationship between each CDM group to which the DMRS ports allocated for the UE belong and the TCI state, corresponding indication information is added in the DCI to indicate the corresponding relationship between each CDM group to which the DMRS ports allocated for the UE belong and the TCI state, to flexibly indicate the TCI state corresponding to each CDM group to which the DMRS ports belong, support the dynamic adjustment of the quantity of the DMRS ports corresponding to different TCI states, and improve the flexibility of NC-JT.

BRIEF DESCRIPTION OF THE DRAWINGS

In order to explain the embodiments of the present application more clearly, the drawings used in the embodiments will be briefly introduced below. Apparently, the drawings introduced below are only some embodiments of the present application, other drawings can also be obtained according to these drawings.

DETAILED DESCRIPTION OF THE EMBODIMENTS (1) The UE is also referred to as a terminal, a mobile station (MS), a mobile terminal (MT), etc., and is a device to provide users with voice and/or data connectivity, e.g., the terminal device includes a handheld device with wireless connectivity, and a vehicle-mounted device, etc. At present, the terminal device may be: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a smart grid, a wireless terminal in transportation safety, a wireless terminal in a smart city, or a wireless terminal in a smart home, etc.

(2) DMRS ports adopt a mode of frequency-division multiplexing (FDM) and CDM for multiplexing, and each CDM group is divided into DMRS ports through orthogonal cover code (OCC). An NR system supports two DMRS pilot types (DMRS pilot type 1 and DMRS pilot type 2), and multiplexing and configuration modes of the two DMRS pilot types are specifically described as follows.

Figure 1A:
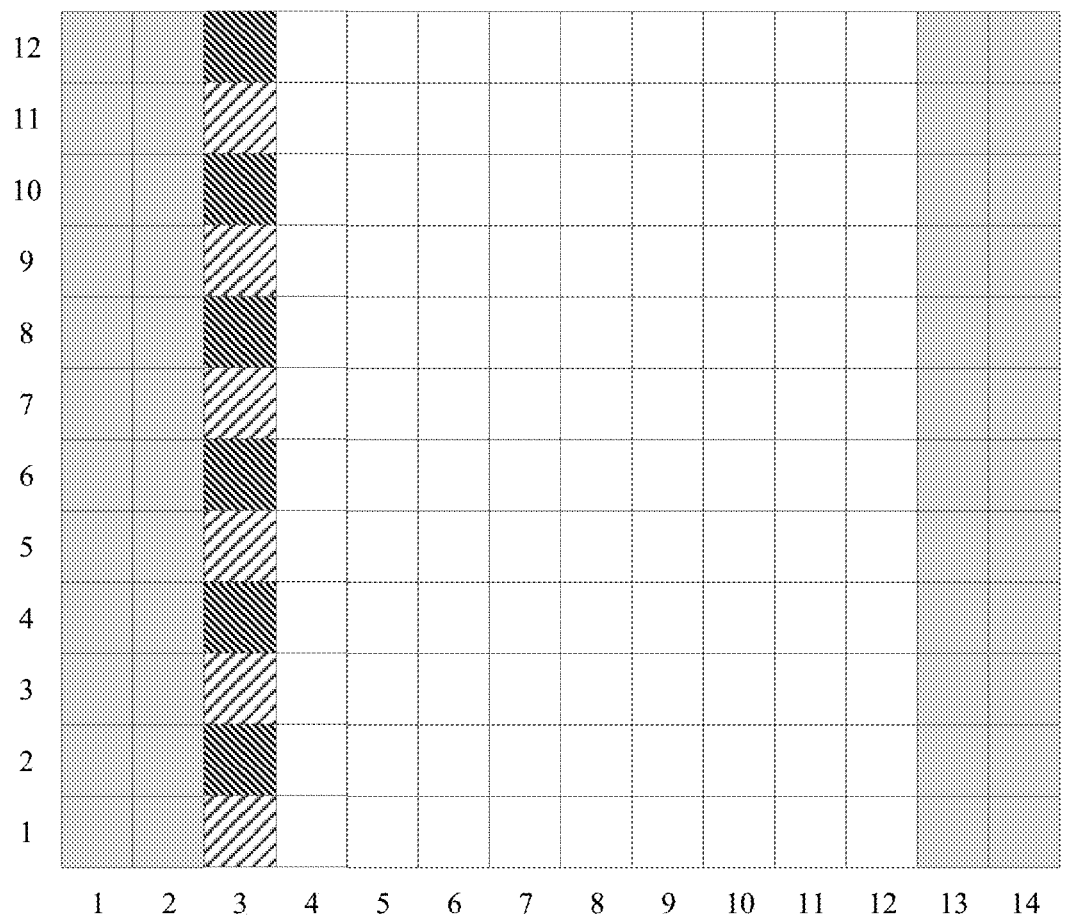
FIGS. 1A and 1B are schematic diagrams of DMRS resources of DMRS pilot type 1 in an embodiment of the present application.
Figure 1B:
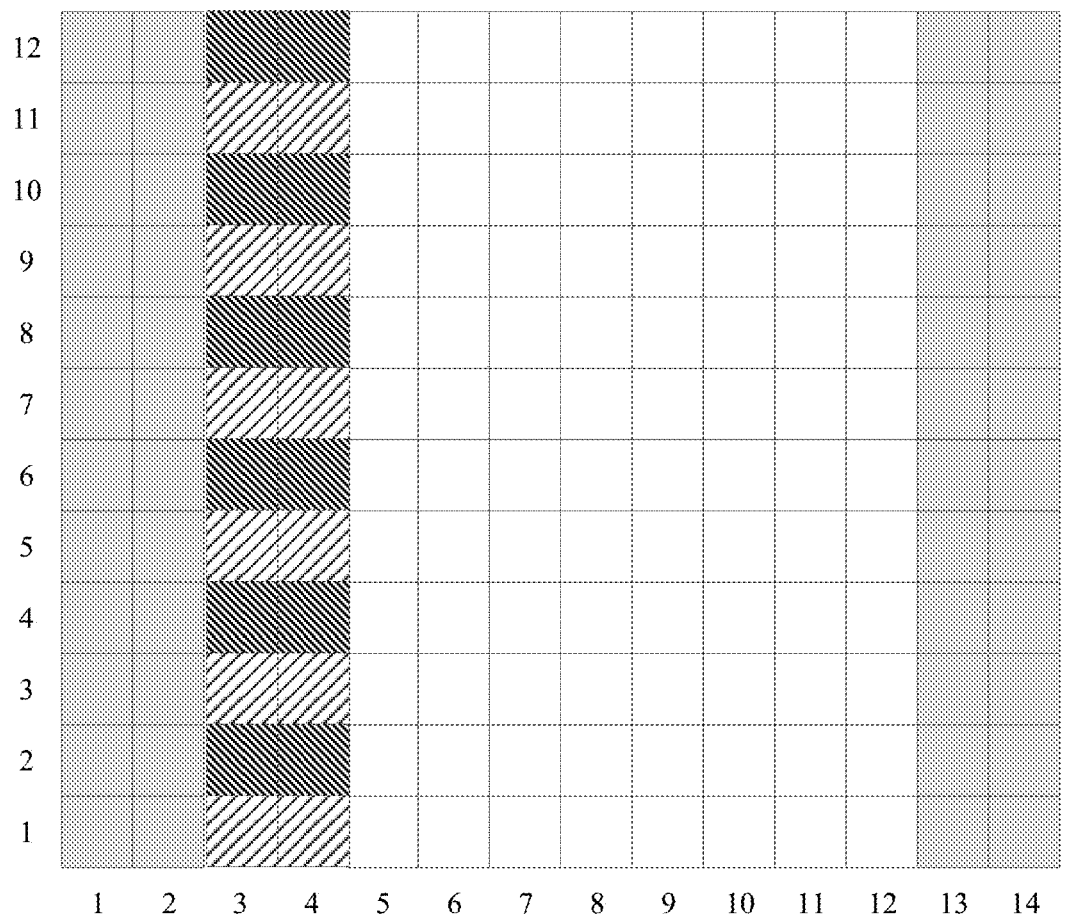

In DMRS pilot type 1, referring to FIG. 1A and FIG. 1B, front-load symbols are divided into two CDM groups. As shown in FIG. 1A, when only one (single) front-load symbol is configured (corresponding to an OFDM symbol numbered 3, shown in the horizontal axis in the figure), subcarriers of the OFDM symbol (the vertical axis in the figure) are divided into two groups, that is, the OFDM symbol is divided into two CDM groups, and each CDM group corresponds to a single OFDM symbol and supports 2-port multiplexing through an OCC mode. As shown in FIG. 1A, one CDM group is DMRS resources (REs) supporting antenna ports 0/1, and the other CDM group is DMRS REs supporting antenna ports 2/3. As shown in FIG. 1B, when two (double) front-load symbols are configured (corresponding to OFDM symbols numbered 3 and 4), subcarriers of the OFDM symbols are divided into two groups, that is, the OFDM symbols are divided into two CDM groups, and each CDM group corresponds to the double OFDM symbols and supports 4-port multiplexing through the OCC mode. As shown in FIG. 1B, one CDM group is DMRS REs supporting antenna ports 0/1/4/5, and the other CDM group is DMRS REs supporting antenna ports 2/3/6/7.

Figure 2A:
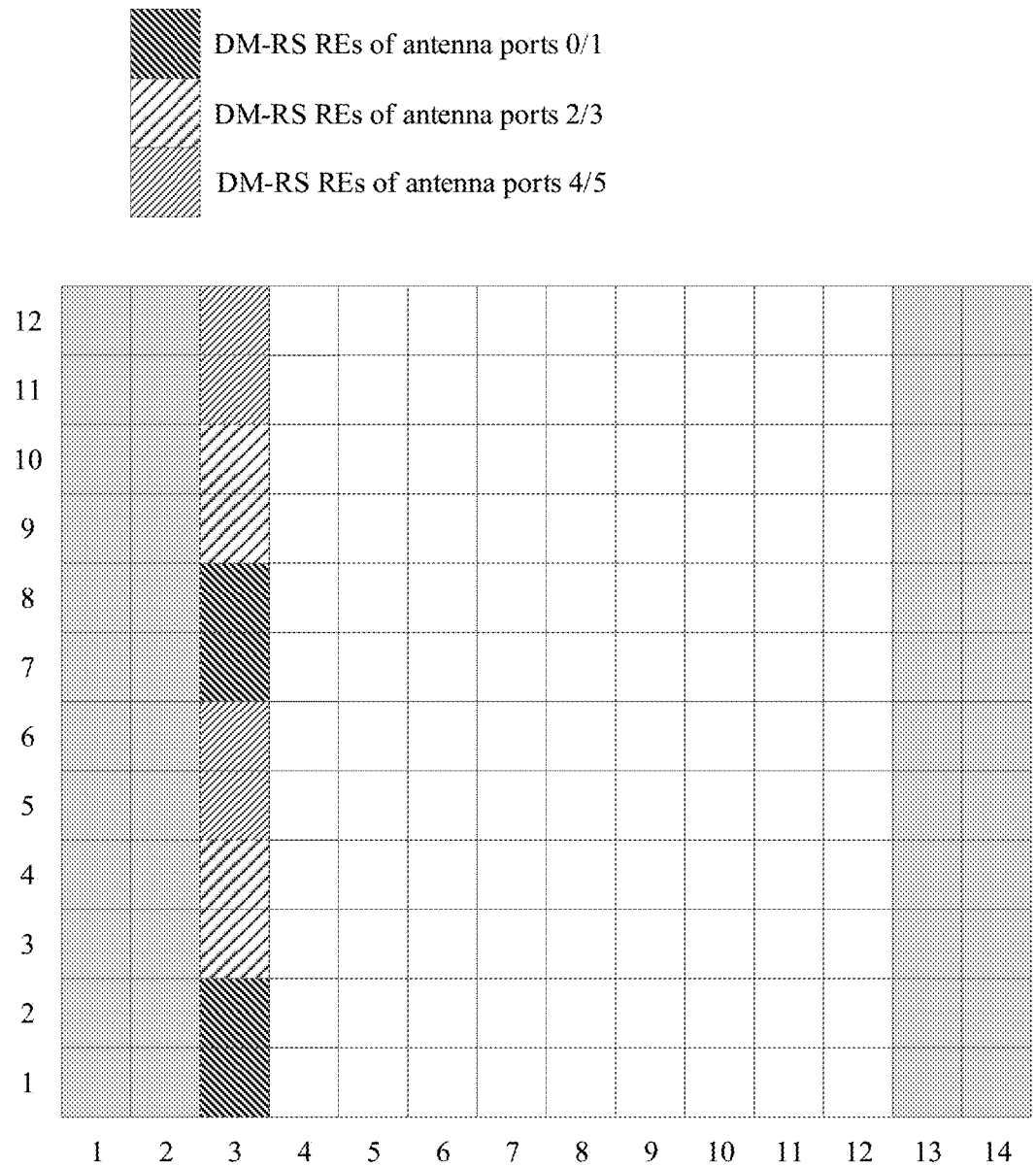
FIGS. 2A and 2B are schematic diagrams of DMRS resources of DMRS pilot type 2 in an embodiment of the present application.
Figure 2B:
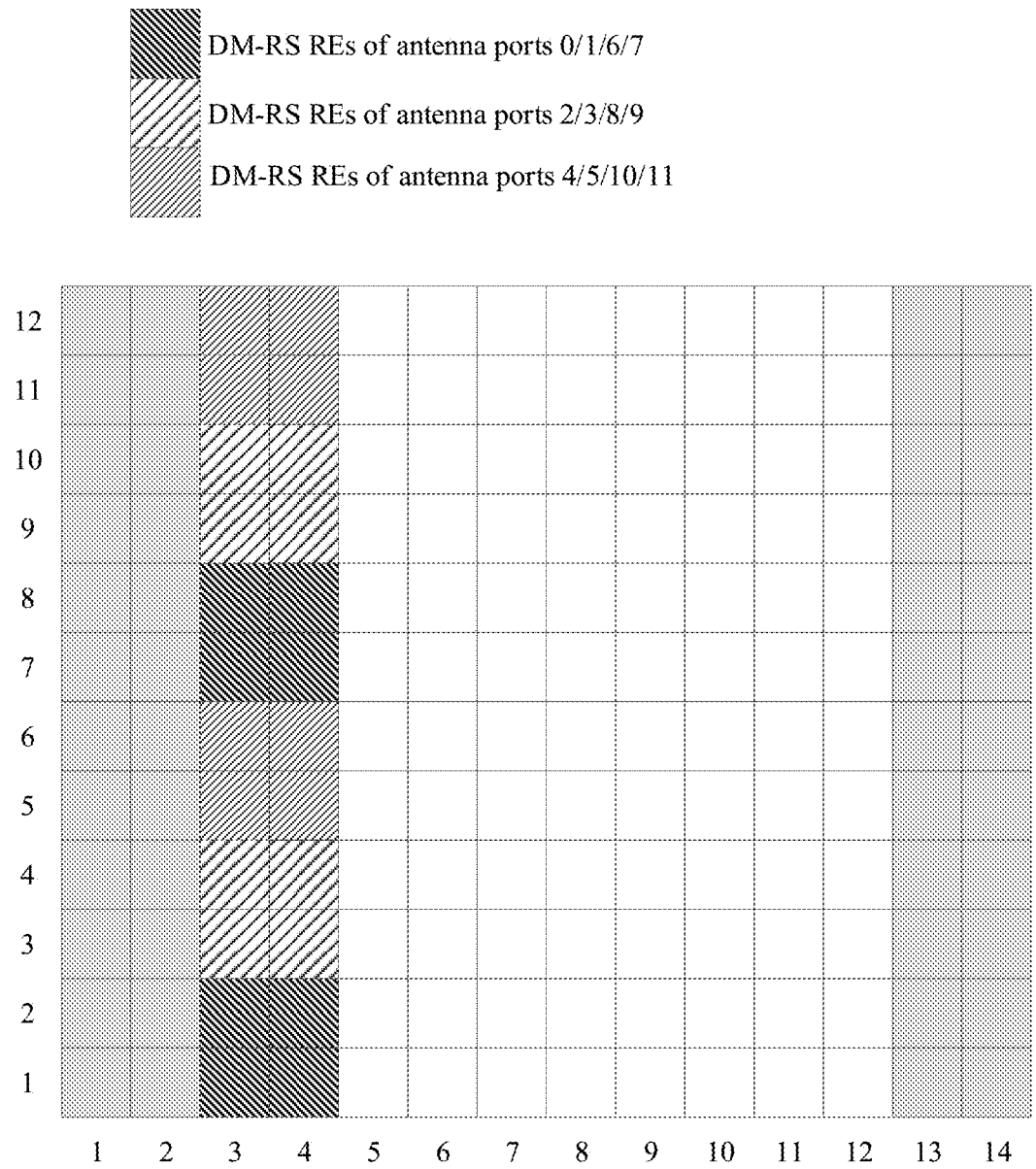

In DMRS pilot type 2, referring to FIG. 2A and FIG. 2B, front-load symbols are divided into three CDM groups. As shown in FIG. 2A, when only one (single) front-load symbol is configured (corresponding to an OFDM symbol numbered 3), subcarriers of the OFDM symbol are divided into three groups, and each group is composed of two adjacent subcarriers, that is, the OFDM symbol is divided into three CDM groups, and each CDM group corresponds to a single OFDM symbol and supports 2-port multiplexing through the OCC mode. As shown in FIG. 2A, one CDM group is DMRS REs supporting antenna ports 0/1, another CDM group is DMRS REs supporting antenna ports 2/3, and another CDM group is DMRS REs supporting antenna ports 4/5. As shown in FIG. 2B, when two (double) front-load symbols are configured (corresponding to OFDM symbols numbered 3 and 4), subcarriers of the OFDM symbols are divided into three groups, and each group is composed of two adjacent subcarriers, that is, the OFDM symbols are divided into three CDM groups, and each CDM group corresponds to the double OFDM symbols and supports 4-port multiplexing through the OCC mode. As shown in FIG. 2B, one CDM group is DMRS REs supporting antenna ports 0/1/6/7, another CDM group is DMRS REs supporting antenna ports 2/3/8/9, and another CDM group is DMRS REs supporting antenna ports 4/5/10/11.

(3) Regarding allocation modes of DMRS ports, in TS38.212, the allocation modes of DMRS ports may be as shown in Tables 1-4.

Table 1: the allocation mode of the DMRS ports when only one OFDM symbol is configured in DMRS pilot type 1 (Antenna port(s) (1000+DMRS port), dmrs-Type=1, maxLength=1).

TABLE 1

One Codeword:
Codeword 0 enabled, Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

Table 2: the allocation mode of the DMRS ports when at most two OFDM symbols are configured in DMRS pilot type 1 (Antenna port(s) (1000+DMRS port), dmrs-Type=1, maxLength=2).

TABLE 2

| | One Codeword: Codeword 0 enabled, Codeword 1 disabled | | | | Two Codewords: Codeword 0 enabled, Codeword 1 disabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

Table 3: the allocation mode of the DMRS ports when only one OFDM symbol is configured in DMRS pilot type 2 (Antenna port(s) (1000+DMRS port), dmrs-Type=2, max-Length=1).

TABLE 3

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

Table 4: the of allocation mode the DMRS ports when at most two OFDM symbols are configured in DMRS pilot type 2 (Antenna port(s) (1000+DMRS port), dmrs-Type=2, maxLength=2).

TABLE 4

| | One Codeword: Codeword 0 enabled, Codeword 1 disabled | | | | Two Codewords: Codeword 0 enabled, Codeword 1 disabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

In Tables 1-4, after allocating the DMRS ports for the UE, a base station sends corresponding TCI information to the UE, so that transmission configuration of the DMRS ports may be indicated to the UE. The TCI information includes "values" in Tables 1-4.

For example, in the condition that DMRS pilot type 1 is adopted and only one OFDM symbol is configured, if the base station allocates a DMRS port 0 and a DMRS port 2 for the UE, and configures two CDM groups (according to the provisions in TS38.212, the DMRS port 0 and the DMRS port 2 belong to different CDM groups respectively), the base station sends the DCI to the UE. The DCI includes TCI. According to Table 1, the value included by the TCI is 11. The UE may know the DMRS port 0 and the DMRS port 2 allocated by the base station according to the received TCI.

(4) QCL is a state assumption between antenna ports, and if one antenna port is quasi co-located with another antenna port, it means that large-scale parameters of a signal received by one antenna port may be all or partially inferred from large-scale parameters of a signal received by another antenna port. The large-scale parameters include one or more of delay spread, Doppler spread, Doppler frequency shift, spatial reception parameters, average channel gain, average delay, etc.

QCL emerges with a CoMP technology, TRPs or antenna panels involved in the CoMP process may correspond to TRPs in different geographical locations or sectors with the antenna panels having different orientations. For example, when the terminal receives data from different TRPs or antenna panels, the spatial differences of all TRPs or antenna panels will result in the differences of the large-scale channel parameters of receiving links from the different TRPs or antenna panels, such as Doppler frequency shift and delay spread. The large-scale parameters of channels directly affect the adjustment and optimization of filter coefficients during channel estimation. Corresponding to signals emitted by the different TRPs or antenna panels, different channel estimation filter parameters should be used to adapt to the corresponding channel propagation characteristics. Therefore, although the differences in the spatial positions or angles of all TRPs or antenna panels are transparent to the terminal and the multipoint transmission operation itself, the influence of the spatial differences on the large-scale parameters of the channels is an important factor that needs to be considered when the terminal performs channel estimation and reception detection. That two antenna ports are QCL in the sense of certain large-scale parameters means that these large-scale parameters of the two antenna ports are the same. In other words, as long as certain large-scale parameters of the two ports are the same, regardless of whether there is a difference in their actual physical positions or corresponding antenna panel orientations, the terminal may consider that the two antenna ports are sent from the same location (i.e., quasi co-located).

For some typical application scenarios, considering the possible QCL relationship between various reference signals, from the perspective of simplifying signaling, in the NR system, several large-scale parameters of the channels are divided into following four types corresponding to four QCL types, to perform configuration or indication according to different scenarios.

QCL-Type A: parameters involved in this type of QCL include: {Doppler frequency shift, Doppler spread, average delay, delay spread}. Except for the spatial reception parameters, other large-scale parameters are the same. For frequency bands of 6 GHz or below, the spatial reception parameters may not be required.

QCL-Type B: parameters involved in this type of QCL include: {Doppler frequency shift, Doppler spread}. The parameters are only for the following two cases with the frequency bands of 6 GHz or below.

Case 1: when a narrow-beam reference signal is used, a wide-beam reference signal may be used as a QCL reference. For example, a time-frequency tracking reference signal (TRS) is generally sent by a sector-level wide beam, while a channel state information-reference signal (CSI-RS) may be sent by a narrow beam. In this case, it is generally believed that the Doppler parameters experienced by signals sent from the same station (such as the TRPs or antenna panels) are still approximately the same. However, scatterers covered by beams with different widths are different, which will have an impact on delay spread and average delay parameters experienced by signal propagation. In this case, it cannot be assumed that the CSI-RS and the TRS are QCL in the sense of the delay spread and average delay parameters.

Case 2: the time domain density of a target reference signal is insufficient, but the frequency domain density is sufficient. For example, when the TRS is used as the QCL reference of the CSI-RS, since the time domain density of the CSI-RS depends on configuration, the time domain density may not be sufficient for accurately estimating the Doppler parameters of a channel, so the Doppler parameters may be obtained from the TRS which is QCL with the CSI-RS. On the other hand, the frequency domain density of the CSI-RS is sufficient for estimating frequency domain parameters such as average delay and delay spread, so these parameters may be obtained from the CSI-RS itself.

QCL-Type C: parameters involved in this type of QCL include: {Doppler frequency shift, average delay}. The parameters are only for the frequency bands of 6 GHz or above with a synchronization signal block (SSB) as the QCL reference. Due to the limited resources and density occupied by the SSB, it is generally assumed that only some rough large-scale information, namely, Doppler frequency shift and average delay, may be obtained from the SSB, while other large-scale parameters need to be obtained from the target reference signal itself.

QCL-Type D: a parameter involved in this type of QCL includes: {a spatial reception parameter}. As mentioned earlier, since this parameter is mainly for the frequency bands of 6 GHz or above, it is individually regarded as a QCL type.

In the embodiments of the present application, one or more reference signals used as the QCL reference included in the TCI state may be one or more of the TRS, the CSI-RS, or the like.

In addition, it should be understood that in the descriptions of the present application, words such as "first" and "second" are only used for the purpose of distinguishing the descriptions, and cannot be understood as indicating or implying relative importance, nor can they be understood as indicating or implying the sequence.

The embodiments of the present application will be described in detail below with reference to the accompanying drawings.

Embodiment 1

A method for indicating TCI provided by an embodiment of the present application is applied to a base station and includes the following:

when TCI in DCI configured for UE corresponds to at least two TCI states, a corresponding relationship between a CDM group and the TCI states is indicated by the DCI, where the CDM group is a CDM group to which DMRS ports allocated by the base station for the UE belong.

Specifically, usually a TCI information field corresponds to one or two TCI states. If the TCI in the DCI configured by the base station for the UE corresponds to one TCI state, the UE may accurately determine that the CDM group to which the DMRS ports allocated for the UE belong correspond to the TCI state. If the TCI in the DCI configured for the UE corresponds to two or more TCI states, the UE cannot determine the corresponding relationship between the CDM group to which the DMRS ports allocated for the UE belong and two or more TCI states. In the embodiment of the present application, the separate information field is introduced in the DCI, and according to the corresponding relationship between each CDM group to which the DMRS ports allocated for the UE belong and the TCI state, corresponding indication information is added in the separate information field introduced in the DCI, to indicate the corresponding relationship between each CDM group to which the DMRS ports allocated for the UE belong and the TCI state, to flexibly indicate the TCI state corresponding to each CDM group to which the DMRS ports belong, support the dynamic adjustment of the quantity of the DMRS ports corresponding to different TCI states, and improve the flexibility of NC-JT.

The specific description will be given below in combination with DMRS pilot types that the DMRS ports allocated for the UE conform to and the two TCI states corresponding to the TCI.

DMRS pilot type 1.

In the embodiment of the present application, two CDM groups of DMRS pilot type 1 are a first CDM group and a second CDM group respectively, and the two TCI states corresponding to the TCI in the DCI configured for the UE are a first TCI state and a second TCI state respectively. If the DMRS ports allocated for the UE conform to the DMRS pilot type 1, indicating, by the DCI, the corresponding relationship between each CDM group to which the DMRS ports allocated for the UE belong and the TCI state, may adopt the following manners.

Manner 1 (1-1).

Indicating, by the DCI, the corresponding relationship between the CDM group and the TCI states, includes one of the following:
(1) indicating, by first indication information in the DCI, that the CDM group to which the DMRS ports allocated for the UE belong corresponds to the first TCI state of the two TCI states;
(2) indicating, by second indication information in the DCI, that the CDM group to which the DMRS ports allocated for the UE belong corresponds to the second TCI state of the two TCI states;
(3) indicating, by third indication information in the DCI, that the first CDM group to which the DMRS ports allocated for the UE belong corresponds to the first TCI state of the two TCI states, and the second CDM group to which the DMRS ports belong corresponds to the second TCI state of the two TCI states; or
(4) indicating, by fourth indication information in the DCI, that the first CDM group to which the DMRS ports allocated for the UE belong corresponds to the second TCI state of the two TCI states, and the second CDM group to which the DMRS ports belong corresponds to the first TCI state of the two TCI states.

Table 5: information to indicate selection of TCI states and corresponding relationships between the TCI states and CDM groups in DCI.

TABLE 5

| Case | Selection of TCI state(s) and corresponding relationship between TCI state(s) and CDM group(s) | Number of CDM group(s) to which allocated DMRS ports belong |
|---|---|---|
| 0 | corresponding to TCI state 0 | 1 or 2 |
| 1 | corresponding to TCI state 1 | 1 or 2 |
| 2 | TCI state 0 corresponds to CDM group A, TCI state 1 corresponds to CDM group B | 2 |
| 3 | TCI state 0 corresponds to CDM group B, TCI state 1 corresponds to CDM group A | 2 |

Referring to Table 5, taking that the first TCI state is a TCI state 0, the second TCI state is a TCI state 1, the first CDM group is a CDM group A, and the second CDM group is a CDM group B as an example, A and B may be different digits, representing the serial numbers of the CDM groups, such as 1 and 2, where when the Case in Table 5 is used as indication information, 2 bits need to be occupied in the DCI for indication.

Indication information (Case) 0: if the DMRS ports allocated for the UE belong to at least one CDM group, such as the CDM group A, or the CDM group B, or the CDM group A and the CDM group B, which all correspond to the TCI state 0, the base station adds the first indication information in the DCI, such as "0", used to indicate that the CDM group to which the DMRS ports allocated for the UE belong corresponds to the TCI state 0.

Case 1: if the DMRS ports allocated for the UE belong to at least one CDM group, such as the CDM group A, or the CDM group B, or the CDM group A and the CDM group B, which all correspond to the TCI state 1, the base station adds the second indication information to the DCI, such as "1", used to indicate that the CDM group to which the allocated DMRS ports belong corresponds to the TCI state 1.

Case 2: if the DMRS ports allocated for the UE belong to two CDM groups, namely the CDM group A and the CDM group B, CDM group A corresponds to the TCI state 0, and the CDM group B corresponds to the TCI state 1, the base station adds the third indication information to the DCI, such as "2", used to indicate that the CDM group A to which the allocated DMRS ports belong corresponds to the TCI state 0, and the CDM group B to which the allocated DMRS ports belong corresponds to the TCI state 1.

Case 3: if the DMRS ports allocated for the UE belong to two CDM groups, namely the CDM group A and the CDM group B, the CDM group A corresponds to the TCI state 1, and the CDM group B corresponds to the TCI state 0, the base station adds the fourth indication information to the DCI, such as "3", used to indicate that the CDM group A to which the allocated DMRS ports belong corresponds to the TCI state 1, and the CDM group B to which the allocated DMRS ports belong corresponds to the TCI state 0.

Specifically, when the DMRS pilot type corresponding to the DMRS ports allocated for the UE is DMRS pilot type 1, and the TCI corresponds to two TCI states, the UE determines the corresponding relationship between the CDM group to which the DMRS ports allocated for the UE belong and the two TCI states corresponding to the TCI in the DCI according to the received indication information in the DCI sent by the base station. If the indication information in the DCI is the fourth indication information, such as "3", the UE determines that the CDM group A to which the allocated DMRS ports belong corresponds to the TCI state 1, and the CDM group B to which the allocated DMRS ports belong corresponds to the TCI state 0. In the embodiment of the present application, the first indication information, the second indication information, the third indication information, and the fourth indication information are different.

Manner 2 (1-2).

Indicating, by the DCI, the corresponding relationship between the CDM group and the TCI states, includes one of:
(1) indicating, by fifth indication information in the DCI, that if the DMRS ports allocated for the UE belong to one CDM group, the one CDM group corresponds to the first TCI state of the two TCI states; and if the DMRS ports allocated for the UE belong to two CDM groups, the first CDM group to which the DMRS ports belong corresponds to the first TCI state of the two TCI states, and the second CDM group to which the DMRS ports belong corresponds to the second TCI state of the two TCI states; or
(2) indicating, by sixth indication information in the DCI, that if the DMRS ports allocated for the UE belong to one CDM group, the one CDM group corresponds to the second TCI state of the two TCI states; and if the DMRS ports allocated for the UE belong to two CDM groups, the first CDM group to which the DMRS ports belong corresponds to the second TCI state of the two TCI states, and the second CDM group to which the DMRS ports belong corresponds to the first TCI state of the two TCI states.

Table 6: information to indicate selection of TCI states and corresponding relationships between the TCI states and CDM groups in DCI.

TABLE 6

| | Selection of TCI state(s) and corresponding relationship between TCI state(s) and CDM group(s) | |
| --- | --- | --- |
| Case | Number of CDM group(s) to which allocated DMRS ports belong is 1 | Number of CDM group(s) to which allocated DMRS ports belong is 2 |
| 0 | Corresponding to TCI state 0 | TCI state 0 corresponds to CDM group A, TCI state 1 corresponds to CDM group B |
| 1 | Corresponding to TCI state 1 | TCI state 0 corresponds to CDM group B, TCI state 1 corresponds to CDM group A |

Referring to Table 6, taking that the first TCI state is a TCI state 0, the second TCI state is a TCI state 1, the first CDM group is a CDM group A, and the second CDM group is a CDM group B as an example, A and B may be different digits, representing the serial numbers of the CDM groups, such as 1 and 2, where when the Case in Table 6 is used as indication information, 1 bit needs to be occupied in the DCI for indication.

Case 0: if the DMRS ports allocated for the UE belong to one CDM group, such as the CDM group A or the CDM group B, which corresponds to the TCI state 0, or the DMRS ports allocated for the UE belong to two CDM groups, namely the CDM group A and the CDM group B, the CDM group A corresponds to the TCI state 0 and the CDM group B corresponds to the TCI state 1, the base station adds the fifth indication information in the DCI, such as "0", used to indicate that if the allocated DMRS ports belong to one CDM group, the one CDM group corresponds to the TCI state 0; and if the allocated DMRS ports belong to two CDM groups, the CDM group A to which the DMRS ports belong corresponds to the TCI state 0, and the CDM group B to which the DMRS ports belong corresponds to the TCI state 1.

Case 1: if the DMRS ports allocated for the UE belong to one CDM group, such as the CDM group A or the CDM group B, which corresponds to the TCI state 1, or the DMRS ports allocated for the UE belong to two CDM groups, namely the CDM group A and the CDM group B, the CDM group A corresponds to the TCI state 1 and the CDM group B corresponds to the TCI state 0, the base station adds the sixth indication information in the DCI, such as "1", used to indicate that if the allocated DMRS ports belong to one CDM group, the one CDM group corresponds to the TCI state 1; and if the allocated DMRS ports belong to two CDM groups, the CDM group A to which the DMRS ports belong corresponds to the TCI state 1, and the CDM group B to which the DMRS ports belong corresponds to the TCI state 0.

Specifically, when the DMRS pilot type corresponding to the DMRS ports allocated for the UE is DMRS pilot type 1, and the TCI corresponds to two TCI states, the UE determines the corresponding relationship between the CDM group to which the DMRS ports allocated for the UE belong and the two TCI states corresponding to the TCI in the DCI according to the received indication information in the DCI sent by the base station. If the indication information in the DCI is the fifth indication information, such as "0", the UE determines that if the allocated DMRS ports belong to one CDM group, the one CDM group corresponds to the TCI state 0; and if the allocated DMRS ports belong to two CDM groups, the CMD group A to which the DMRS ports belong corresponds to the TCI state 0 and the CDM group B to which the DMRS ports belong corresponds to the TCI state 1. In the embodiment of the present application, the fifth indication information and the sixth indication information are different.

DMRS Pilot Type 2.

In the embodiment of the present application, three CDM groups of DMRS pilot type 2 are a first CDM group, a second CDM group and a third CDM group respectively; and two TCI states corresponding to TCI in DCI configured for UE are a first TCI state and a second TCI state respectively. If the DMRS ports allocated for the UE conform to the DMRS pilot type 2, indicating, by the DCI, the corresponding relationship between each CDM group to which the DMRS ports allocated for the UE belong and the TCI state, may adopt the following manners.

Manner 1 (2-1).

Indicating, by the DCI, the corresponding relationship between the CDM group and the TCI states, includes one of:
(1) indicating, by seventh indication information in the DCI, that the CDM group to which the DMRS ports allocated for the UE belong corresponds to the first TCI state of the two TCI states;
(2) indicating, by eighth indication information in the DCI, that the CDM group to which the DMRS ports allocated for the UE belong corresponds to the second TCI state of the two TCI states;
(3) indicating, by ninth indication information in the DCI, that the first CDM group to which the DMRS ports allocated for the UE belong corresponds to the first TCI state of the two TCI states, and other CDM groups to which the DMRS ports belong correspond to the second TCI state of the two TCI states;

(4) indicating, by tenth indication information in the DCI, that the first CDM group to which the DMRS ports allocated for the UE belong corresponds to the second TCI state of the two TCI states, and other CDM groups to which the DMRS ports belong correspond to the first TCI state of the two TCI states;

(5) indicating, by eleventh indication information in the DCI, that the second CDM group to which the DMRS ports allocated for the UE belong corresponds to the first TCI state of the two TCI states, and other CDM groups to which the DMRS ports belong correspond to the second TCI state of the two TCI states;

(6) indicating, by twelfth indication information in the DCI, that the second CDM group to which the DMRS ports allocated for the UE belong corresponds to the second TCI state of the two TCI states, and other CDM groups to which the DMRS ports belong correspond to the first TCI state of the two TCI states;

(7) indicating, by thirteenth indication information in the DCI, that the third CDM group to which the DMRS ports allocated for the UE belong corresponds to the first TCI state of the two TCI states, and other CDM groups to which the DMRS ports belong correspond to the second TCI state of the two TCI states; or (8) indicating, by fourteenth indication information in the DCI, that the third CDM group to which the DMRS ports allocated for the UE belong corresponds to the second TCI state of the two TCI states, and other CDM groups to which the DMRS ports belong correspond to the first TCI state of the two TCI states.

Table 7: information to indicate selection of TCI states and corresponding relationships between the TCI states and CDM groups in DCI.

TABLE 7

| Case | Selection of TCI state(s) and corresponding relationship between TCI state(s) and CDM group(s) | Number of CDM group(s) to which allocated DMRS ports belong |
| --- | --- | --- |
| 0 | corresponding to TCI state 0 | 1, 2 or 3 |
| 1 | corresponding to TCI state 1 | 1, 2 or 3 |
| 2 | TCI state 0 corresponds to CDM group A, TCI state 1 corresponds to other CDM groups | 2 or 3 |
| 3 | TCI state 1 corresponds to CDM group A, TCI state 0 corresponds to other CDM groups | 2 or 3 |
| 4 | TCI state 0 corresponds to CDM group B, TCI state 1 corresponds to other CDM groups | 2 or 3 |
| 5 | TCI state 1 corresponds to CDM group B, TCI state 0 corresponds to other CDM groups | 2 or 3 |
| 6 | TCI state 0 corresponds to CDM group C, TCI state 1 corresponds to other CDM groups | 2 or 3 |
| 7 | TCI state 1 corresponds to CDM group C, TCI state 0 corresponds to other CDM groups | 2 or 3 |

Referring to Table 7, taking that the first TCI state is a TCI state 0, the second TCI state is a TCI state 1, the first CDM group is a CDM group A, the second CDM group is a CDM group B and the third CDM group is a CDM group C as an example, A, B and C may be different digits, representing the serial numbers of the CDM groups, such as 1, 2 and 3, where when the Case in Table 7 is used as indication information, 3 bits need to be occupied in the DCI for indication.

Case 0: if the DMRS ports allocated for the UE belong to at least one CDM group, which corresponds to the TCI state 0, the base station adds the seventh indication information in the DCI, such as "0", used to indicate that the CDM group to which the DMRS ports allocated for the UE belong corresponds to the TCI state 0.

Case 1: if the DMRS ports allocated for the UE belong to at least one CDM group, which corresponds to the TCI state 1, the base station adds the eighth indication information to the DCI, such as "1", used to indicate that the CDM group to which the allocated DMRS ports belong corresponds to the TCI state 1.

Case 2: if the DMRS ports allocated for the UE belong to at least two CDM groups containing the CDM group A, the CDM group A corresponds to the TCI state 0 and other CDM groups correspond to the TCI state 1, the base station adds the ninth indication information to the DCI, such as "2", used to indicate that the CDM group A to which the allocated DMRS ports belong corresponds to the TCI state 0, and other CDM groups to which the allocated DMRS ports belong correspond to the TCI state 1.

Case 3: if the DMRS ports allocated for the UE belong to at least two CDM groups containing the CDM group A, the CDM group A corresponds to the TCI state 1 and other CDM groups correspond to the TCI state 0, the base station adds the tenth indication information to the DCI, such as "3", used to indicate that the CDM group A to which the allocated DMRS ports belong corresponds to the TCI state 1, and other CDM groups to which the allocated DMRS ports belong correspond to the TCI state 0.

Case 4: if the DMRS ports allocated for the UE belong to at least two CDM groups containing the CDM group B, the CDM group B corresponds to the TCI state 0 and other CDM groups correspond to the TCI state 1, the base station adds the eleventh indication information to the DCI, such as "4", used to indicate that the CDM group B to which the allocated DMRS ports belong corresponds to the TCI state 0, and other CDM groups to which the allocated DMRS ports belong correspond to the TCI state 1.

Case 5: if the DMRS ports allocated for the UE belong to at least two CDM groups containing the CDM group B, the CDM group B corresponds to the TCI state 1 and other CDM groups correspond to the TCI state 0, the base station adds the twelfth indication information to the DCI, such as "5", used to indicate that the CDM group B to which the allocated DMRS ports belong corresponds to the TCI state 1, and other CDM groups to which the allocated DMRS ports belong correspond to the TCI state 0.

Case 6: if the DMRS ports allocated for the UE belong to at least two CDM groups containing the CDM group C, the CDM group C corresponds to the TCI state 0 and other CDM groups correspond to the TCI state 1, the base station adds the thirteenth indication information to the DCI, such as "6", used to indicate that the CDM group C to which the allocated DMRS ports belong corresponds to the TCI state 0, and other CDM groups to which the allocated DMRS ports belong correspond to the TCI state 1.

Case 7: if the DMRS ports allocated for the UE belong to at least two CDM groups containing the CDM group C, the CDM group C corresponds to the TCI state 1 and other CDM groups correspond to the TCI state 0, the base station adds the fourteenth indication information to the DCI, such as "7", used to indicate that the CDM group C to which the allocated DMRS ports belong corresponds to the TCI state 1, and other CDM groups to which the allocated DMRS ports belong correspond to the TCI state 0.

Specifically, when the DMRS pilot type corresponding to the DMRS ports allocated for the UE is DMRS pilot type 2, and the TCI corresponds to two TCI states, the UE determines the corresponding relationship between the CDM group to which the DMRS ports allocated for the UE belong and the two TCI states corresponding to the TCI in the DCI according to the received indication information in the DCI sent by the base station. If the indication information in the DCI is the fourteenth indication information, such as "7", the UE determines that the CDM group C to which the allocated DMRS ports belong corresponds to the TCI state 1, and other CDM groups to which the allocated DMRS ports belong correspond to the TCI state 0. In the embodiment of the present application, the seventh indication information to the fourteenth indication information are different.

Manner 2 (2-2).

Indicating, by the DCI, the corresponding relationship between the CDM group and the TCI states, includes one of:

(1) indicating, by fifteenth indication information in the DCI, that if the DMRS ports allocated for the UE belong to one CDM group, the one CDM group corresponds to the first TCI state of the two TCI states, and if the DMRS ports allocated for the UE belong to at least two CDM groups containing the first CDM group, the first CDM group to which the DMRS ports belong corresponds to the first TCI state of the two TCI states, and other CDM groups to which the DMRS ports belong correspond to the second TCI state of the two TCI states;

(2) indicating, by sixteenth indication information in the DCI, that if the DMRS ports allocated for the UE belong to one CDM group, the one CDM group corresponds to the second TCI state of the two TCI states, and if the DMRS ports allocated for the UE belong to at least two CDM groups containing the first CDM group, the first CDM group to which the DMRS ports belong corresponds to the second TCI state of the two TCI states, and other CDM groups to which the DMRS ports belong correspond to the first TCI state of the two TCI states;

(3) indicating, by seventeenth indication information in the DCI, that the second CDM group to which the DMRS ports allocated for the UE belong corresponds to the first TCI state of the two TCI states, and other CDM groups to which the DMRS ports belong correspond to the second TCI state of the two TCI states;

(4) indicating, by eighteenth indication information in the DCI, that the second CDM group to which the DMRS ports allocated for the UE belong corresponds to the second TCI state of the two TCI states, and other CDM groups to which the DMRS ports belong correspond to the first TCI state of the two TCI states;

(5) indicating, by nineteenth indication information in the DCI, that the third CDM group to which the DMRS ports allocated for the UE belong corresponds to the first TCI state of the two TCI states, and other CDM groups to which the DMRS ports belong correspond to the second TCI state of the two TCI states; or (6) indicating, by twentieth indication information in the DCI, that the third CDM group to which the DMRS ports allocated for the UE belong corresponds to the second TCI state of the two TCI states, and other CDM groups to which the DMRS ports belong correspond to the first TCI state of the two TCI states.

Table 8: information to indicate selection of TCI states and corresponding relationships between the TCI states and CDM groups in DCI.

TABLE 8

| | Selection of TCI state(s) and corresponding relationship between TCI state(s) and CDM group(s) | |
|---|---|---|
| Case | Number of CDM group(s) occupied by allocated DMRSs is 1 | Number of CDM group(s) occupied by allocated DMRSs is 2 or 3 |
| 0 | Selecting TCI state 0 | TCI state 0 corresponds to CDM group A, TCI state 1 corresponds to other CDM groups |
| 1 | Selecting TCI state 1 | TCI state 1 corresponds to CDM group A, TCI state 0 corresponds to other CDM groups |
| 2 | | TCI state 0 corresponds to CDM group B, TCI state 1 corresponds to other CDM groups |
| 3 | | TCI state 1 corresponds to CDM group B, TCI state 0 corresponds to other CDM groups |
| 4 | | TCI state 0 corresponds to CDM group C, TCI state 1 corresponds to other CDM groups |
| 5 | | TCI state 1 corresponds to CDM group C, TCI state 0 corresponds to other CDM groups |

Referring to Table 8, taking that the first TCI state is a TCI state 0, the second TCI state is a TCI state 1, the first CDM group is a CDM group A, the second CDM group is a CDM group B and the third CDM group is a CDM group C as an example, A, B and C may be different digits, representing the serial numbers of the CDM groups, such as 1, 2 and 3, where when the Case in Table 8 is used as indication information, 3 bits need to be occupied in the DCI for indication; and when states except for Case 2 and Case 3 are indicated, only 2 bits need to be occupied in the DCI for indication.

Case 0: if the DMRS ports allocated for the UE belong to one CDM group, which corresponds to the TCI state 0, or the DMRS ports allocated for the UE belong to at least two CDM groups containing the CDM group A, the CDM group A corresponds to the TCI state 0, and other CDM groups correspond to the TCI state 1, the base station adds the fifteenth indication information to the DCI, such as "0", used to indicate that: if the DMRS ports allocated for the UE belong to one CDM group, the CDM group corresponds to the TCI state 0; and if the allocated DMRS ports belong to at least two CDM groups containing the CDM group A, the CDM group A to which the DMRS ports belong corresponds to the TCI state 0, and other CDM groups to which the DMRS ports belong correspond to the TCI state 1.

Case 1: if the DMRS ports allocated for the UE belong to one CDM group, which corresponds to the TCI state 1, or the DMRS ports allocated for the UE belong to at least two CDM groups containing the CDM group A, the CDM group A corresponds to the TCI state 1, and other CDM groups correspond to the TCI state 0, the base station adds the sixteenth indication information to the DCI, such as "1", used to indicate that: if the DMRS ports allocated for the UE belong to one CDM group, the one CDM group corresponds to the TCI state 1; and if the allocated DMRS ports belong to at least two CDM groups containing the CDM group A, the CDM group A to which the DMRS ports belong corresponds to the TCI state 1, and other CDM groups to which the DMRS ports belong correspond to the TCI state 0.

Case 2: if the DMRS ports allocated for the UE belong to at least two CDM groups containing the CDM group B, the CDM group B corresponds to the TCI state 0, and other CDM groups correspond to the TCI state 1, the base station adds the seventeenth indication information to the DCI, such as "2", used to indicate that the CDM group B to which the allocated DMRS ports belong corresponds to the TCI state 0, and other CDM groups to which the DMRS ports belong correspond to the TCI state 1.

Case 3: if the DMRS ports allocated for the UE belong to at least two CDM groups containing the CDM group B, the CDM group B corresponds to the TCI state 1, and other CDM groups correspond to the TCI state 0, the base station adds the eighteenth indication information to the DCI, such as "3", used to indicate that the CDM group B to which the allocated DMRS ports belong corresponds to the TCI state 1, and other CDM groups to which the DMRS ports belong correspond to the TCI state 0.

Case 4: if the DMRS ports allocated for the UE belong to at least two CDM groups containing the CDM group C, the CDM group C corresponds to the TCI state 0, and other CDM groups correspond to the TCI state 1, the base station adds the nineteenth indication information to the DCI, such as "4", used to indicate that the CDM group C to which the allocated DMRS ports belong corresponds to the TCI state 0, and other CDM groups to which the DMRS ports belong correspond to the TCI state 1.

Case 5: if the DMRS ports allocated for the UE belong to at least two CDM groups containing the CDM group C, the CDM group C corresponds to the TCI state 1, and other CDM groups correspond to the TCI state 0, the base station adds the twentieth indication information to the DCI, such as "5", used to indicate that the CDM group C to which the allocated DMRS ports belong corresponds to the TCI state 1, and other CDM groups to which the DMRS ports belong correspond to the TCI state 0.

Specifically, when the DMRS pilot type corresponding to the DMRS ports allocated for the UE is DMRS pilot type 2, and the TCI corresponds to two TCI states, the UE determines the corresponding relationship between the CDM group to which the DMRS ports allocated for the UE belong and the two TCI states corresponding to the TCI in the DCI according to the received indication information in the DCI sent by the base station. If the indication information in the DCI is the twentieth indication information, such as "5", the UE determines that the CDM group C to which the allocated DMRS ports belong corresponds to the TCI state 1, and other CDM groups to which the allocated DMRS ports belong correspond to the TCI state 0. In the embodiment of the present application, the fifteenth indication information to the twentieth indication information are different.

Similarly, when the TCI corresponds to more than two TCI states, the base station may also indicate the corresponding relationship between the CDM group to which the DMRS ports allocated for the UE belong and the TCI states by the indication information in the DCI.

Taking that the TCI corresponds to three TCI states as an example, the description will be given below in combination with the DMRS pilot types that the DMRS ports allocated for the UE conform to.

DMRS Pilot Type 1.

In the embodiment of the present application, two CDM groups of DMRS pilot type 1 are a first CDM group and a second CDM group respectively, and three TCI states corresponding to TCI in DCI configured for UE are a first TCI state, a second TCI state and a third TCI state respectively. If the DMRS ports allocated for the UE conform to the DMRS pilot type 1, indicating, by the DCI, the corresponding relationship between each CDM group to which the DMRS ports allocated for the UE belong and the TCI state, includes one of:

(1) indicating, by $(N+1)^{th}$ indication information in the DCI, that the CDM group to which the DMRS ports allocated for the UE belong corresponds to the first TCI state of the three TCI states;

(2) indicating, by $(N+2)^{th}$ indication information in the DCI, that the CDM group to which the DMRS ports allocated for the UE belong corresponds to the second TCI state of the three TCI states;

(3) indicating, by $(N+3)^{th}$ indication information in the DCI, that the CDM group to which the DMRS ports allocated for the UE belong corresponds to the third TCI state of the three TCI states;

(4) indicating, by $(N+4)^{th}$ indication information in the DCI, that the first CDM group to which the DMRS ports allocated for the UE belong corresponds to the first TCI state of the three TCI states, and the second CDM group to which the DMRS ports allocated for the UE belong corresponds to the second TCI state of the three TCI states;

(5) indicating, by $(N+5)^{th}$ indication information in the DCI, that the first CDM group to which the DMRS ports allocated for the UE belong corresponds to the first TCI state of the three TCI states, and the second CDM group to which the DMRS ports allocated for the UE belong corresponds to the third TCI state of the three TCI states;

(6) indicating, by $(N+6)^{th}$ indication information in the DCI, that the first CDM group to which the DMRS ports allocated for the UE belong corresponds to the second TCI state of the three TCI states, and the second CDM group to which the DMRS ports allocated for the UE belong corresponds to the first TCI state of the three TCI states;

(7) indicating, by $(N+7)^{th}$ indication information in the DCI, that the first CDM group to which the DMRS ports allocated for the UE belong corresponds to the second TCI state of the three TCI states, and the second CDM group to which the DMRS ports allocated for the UE belong corresponds to the third TCI state of the three TCI states;

(8) indicating, by $(N+8)^{th}$ indication information in the DCI, that the first CDM group to which the DMRS ports allocated for the UE belong corresponds to the third TCI state of the three TCI states, and the second CDM group to which the DMRS ports allocated for the UE belong corresponds to the first TCI state of the three TCI states; or (9) indicating, by $(N+9)^{th}$ indication information in the DCI, that the first CDM group to which the DMRS ports allocated for the UE belong corresponds to the third TCI state of the three TCI states, and the second CDM group to which the DMRS ports allocated for the UE belong corresponds to the second TCI state of the three TCI states.

In the embodiment of the present application, the $(N+1)^{th}$ indication information, the $(N+2)^{th}$ indication information, . . . and the $(N+9)^{th}$ indication information are different.

DMRS Pilot Type 2.

In the embodiment of the present application, three CDM groups of DMRS pilot type 2 are a first CDM group, a second CDM group and a third CDM group respectively, and three TCI states corresponding to TCI in DCI configured for UE are a first TCI state, a second TCI state and a third TCI state respectively. If the DMRS ports allocated for the UE conform to the DMRS pilot type 2, indicating, by the DCI, the corresponding relationship between each CDM group to which the DMRS ports allocated for the UE belong and the TCI state, may adopt the following manners:

(1) by $(X+1)^{th}$ indication information in the DCI, the CDM group to which the DMRS ports allocated for the UE belong is indicated to correspond to the first TCI state of the three TCI states;

(2) by $(X+2)^{th}$ indication information in the DCI, the CDM group to which the DMRS ports allocated for the UE belong is indicated to correspond to the second TCI state of the three TCI states;

(3) by $(X+3)^{th}$ indication information in the DCI, the CDM group to which the DMRS ports allocated for the UE belong is indicated to correspond to the third TCI state of the three TCI states;

(4) by $(X+4)^{th}$ indication information in the DCI, the first CDM group to which the DMRS ports allocated for the UE belong is indicated to correspond to the first TCI state of the three TCI states, and other CDM groups to which the DMRS ports belong are indicated to correspond to the second TCI state of the three TCI states;

(5) by $(X+5)^{th}$ indication information in the DCI, the first CDM group to which the DMRS ports allocated for the UE belong is indicated to correspond to the first TCI state of the three TCI states, and other CDM groups to which the DMRS ports belong are indicated to correspond to the third TCI state of the three TCI states;

(6) by $(X+6)^{th}$ indication information in the DCI, the second CDM group to which the DMRS ports allocated for the UE belong is indicated to correspond to the second TCI state of the three TCI states, and other CDM groups to which the DMRS ports belong are indicated to correspond to the first TCI state of the three TCI states;

(7) by $(X+7)^{th}$ indication information in the DCI, the second CDM group to which the DMRS ports allocated for the UE belong is indicated to correspond to the second TCI state of the three TCI states, and other CDM groups to which the DMRS ports belong are indicated to correspond to the third TCI state of the three TCI states;

(8) by $(X+8)^{th}$ indication information in the DCI, the third CDM group to which the DMRS ports allocated for the UE belong is indicated to correspond to the third TCI state of the three TCI states, and other CDM groups to which the DMRS ports belong are indicated to correspond to the first TCI state of the three TCI states;

(9) by $(X+9)^{th}$ indication information in the DCI, the third CDM group to which the DMRS ports allocated for the UE belong is indicated to correspond to the third TCI state of the three TCI states, and other CDM groups to which the DMRS ports belong are indicated to correspond to the second TCI state of the three TCI states;

(10) by $(X+10)^{th}$ indication information in the DCI, the first CDM group to which the DMRS ports allocated for the UE belong is indicated to correspond to the first TCI state of the three TCI states, the second CDM group to which the DMRS ports belong is indicated to correspond to the second TCI state of the three TCI states, and the third CDM group to which the DMRS ports belong is indicated to correspond to the third TCI state of the three TCI states;

(11) by $(X+11)^{th}$ indication information in the DCI, the first CDM group to which the DMRS ports allocated for the UE belong is indicated to correspond to the first TCI state of the three TCI states, the second CDM group to which the DMRS ports belong is indicated to correspond to the third TCI state of the three TCI states, and the third CDM group to which the DMRS ports belong is indicated to correspond to the second TCI state of the three TCI states;

(12) by $(X+12)^{th}$ indication information in the DCI, the first CDM group to which the DMRS ports allocated for the UE belong is indicated to correspond to the second TCI state of the three TCI states, the second CDM group to which the DMRS ports belong is indicated to correspond to the first TCI state of the three TCI states, and the third CDM group to which the DMRS ports belong is indicated to correspond to the third TCI state of the three TCI states;

(13) by $(X+13)^{th}$ indication information in the DCI, the first CDM group to which the DMRS ports allocated for the UE belong is indicated to correspond to the second TCI state of the three TCI states, the second CDM group to which the DMRS ports belong is indicated to correspond to the third TCI state of the three TCI states, and the third CDM group to which the DMRS ports belong is indicated to correspond to the first TCI state of the three TCI states;

(14) by $(X+14)^{th}$ indication information in the DCI, the first CDM group to which the DMRS ports allocated for the UE belong is indicated to correspond to the third TCI state of the three TCI states, the second CDM group to which the DMRS ports belong is indicated to correspond to the first TCI state of the three TCI states, and the third CDM group to which the DMRS ports belong is indicated to correspond to the second TCI state of the three TCI states; or

(15) by $(X+15)^{th}$ indication information in the DCI, the first CDM group to which the DMRS ports allocated for the UE belong is indicated to correspond to the third TCI state of the three TCI states, the second CDM group to which the DMRS ports belong is indicated to correspond to the second TCI state of the three TCI states, and the third CDM group to which the DMRS ports belong is indicated to correspond to the first TCI state of the three TCI states.

In the embodiment of the present application, the $(X+1)^{th}$ indication information, the $(X+2)^{th}$ indication information, . . . and the $(X+15)^{th}$ indication information are different.

In the embodiment of the present application, in a condition of the same DMRS pilot type and the quantity of TCI states corresponding to the TCI in the DCI, the indication information used to indicate the corresponding relationship between different CDM groups and the TCI states in the DCI is different, for example, the $(X+1)^{th}$ indication information, the $(X+_2)^{th}$ indication information, . . . and the $(X+15)^{th}$ indication information are different. In addition, because the DMRS pilot type that the DMRS ports allocated by the base station for the UE conform to and the quantity of the TCI states corresponding to the TCI in the DCI are known to the UE, when the DMRS ports allocated for the UE conform to different DMRS pilot types and/or the TCI in the DCI corresponds to different quantities of TCI states, the same indication information may also indicate the corresponding relationship between different CDM groups and the TCI states. Therefore, in the embodiment of the present application, in the DCI, the same indication information may be used to indicate the corresponding relationship between different CDM groups and the TCI states in the condition of the different DMRS pilot types and/or the TCI corresponding to different quantities of TCI states.

For example, the fourth indication information and the tenth indication information may be the same, for example, both "3", used to indicate that: when the DMRS ports allocated for the UE conform to the DMRS pilot type 1, and the TCI corresponds to two TCI states, the first CDM group to which the DMRS ports allocated for the UE belong corresponds to the second TCI state of the two TCI states, and the second CDM group to which the DMRS ports belong corresponds to the first TCI state of the two TCI states; or when the allocated DMRS ports conform to the DMRS pilot type 2, and the TCI corresponds to two TCI states, the first CDM group to which the DMRS ports allocated for the UE belong corresponds to the second TCI state of the two TCI states, and other CDM groups to which the DMRS ports belong correspond to the first TCI state of the two TCI states.

Embodiment 2

Figure 3:
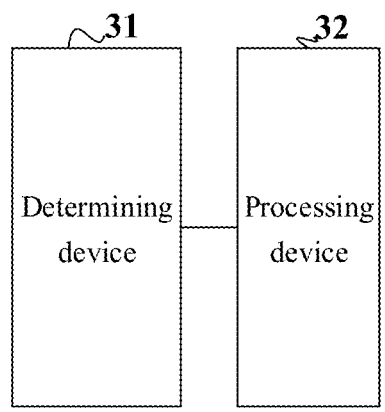
FIG. 3 is a schematic structural diagram of an apparatus for indicating TCI provided by an embodiment of the present application.

FIG. 3 is a schematic structural diagram of an apparatus for indicating TCI provided by an embodiment of the present application. The apparatus for indicating TCI is applied to a base station and includes:
  a determining device 31, configured to determine whether TCI in DCI configured for UE corresponds to at least two TCI states; and
  a processing device 32, configured to indicate, by the DCI, a corresponding relationship between a CDM group and the TCI states, in a case that a determination result of the determining device is yes; where the CDM group is a CDM group to which DMRS ports allocated by the base station for the UE belong.

In one embodiment, the processing device 32 is specifically configured to, if the DMRS ports allocated for the UE conform to a DMRS pilot type 1, and the TCI corresponds to two TCI states, indicate, by the DCI, the corresponding relationship between the CDM group and the TCI states by adopting one of the following manners: by first indication information in the DCI, the CDM group to which the DMRS ports allocated for the UE belong is indicated to correspond to a first TCI state of the two TCI states; by second indication information in the DCI, the CDM group to which the DMRS ports allocated for the UE belong is indicated to correspond to a second TCI state of the two TCI states; by third indication information in the DCI, a first CDM group to which the DMRS ports allocated for the UE belong is indicated to correspond to the first TCI state of the two TCI states, and a second CDM group to which the DMRS ports belong is indicated to correspond to the second TCI state of the two TCI states; or by fourth indication information in the DCI, the first CDM group to which the DMRS ports allocated for the UE belong is indicated to correspond to the second TCI state of the two TCI states, and the second CDM group to which the DMRS ports belong is indicated to correspond to the first TCI state of the two TCI states.

In one embodiment, the processing device 32 is specifically configured to: if the DMRS ports allocated for the UE conform to the DMRS pilot type 1, and the TCI corresponds to two TCI states, indicate, by the DCI, the corresponding relationship between the CDM group and the TCI states by adopting one of the following manners: by fifth indication information in the DCI, if the DMRS ports allocated for the UE belong to one CDM group, the one CDM group is indicated to correspond to the first TCI state of the two TCI states, and if the DMRS ports allocated for the UE belong to two CDM groups, the first CDM group to which the DMRS ports belong is indicated to correspond to the first TCI state of the two TCI states, and the second CDM group to which the DMRS ports belong is indicated to correspond to the second TCI state of the two TCI states; or by sixth indication information in the DCI, if the DMRS ports allocated for the UE belong to one CDM group, the one CDM group is indicated to correspond to the second TCI state of the two TCI states, and if the DMRS ports allocated for the UE belong to two CDM groups, the first CDM group to which the DMRS ports belong is indicated to correspond to the second TCI state of the two TCI states, and the second CDM group to which the DMRS ports belong is indicated to correspond to the first TCI state of the two TCI states.

In one embodiment, the processing device 32 is specifically configured to: if the DMRS ports allocated for the UE conform to a DMRS pilot type 2, and the TCI corresponds to two TCI states, indicate, by the DCI, the corresponding relationship between the CDM group and the TCI states by adopting one of the following manners: by seventh indication information in the DCI, the CDM group to which the DMRS ports allocated for the UE belong is indicated to correspond to the first TCI state of the two TCI states; by eighth indication information in the DCI, the CDM group to which the DMRS ports allocated for the UE belong is indicated to correspond to the second TCI state of the two TCI states; by ninth indication information in the DCI, the first CDM group to which the DMRS ports allocated for the UE belong is indicated to correspond to the first TCI state of the two TCI states, and other CDM groups to which the DMRS ports belong are indicated to correspond to the second TCI state of the two TCI states; by tenth indication information in the DCI, the first CDM group to which the DMRS ports allocated for the UE belong is indicated to correspond to the second TCI state of the two TCI states, and other CDM groups to which the DMRS ports belong are indicated to correspond to the first TCI state of the two TCI states; by eleventh indication information in the DCI, the second CDM group to which the DMRS ports allocated for the UE belong is indicated to correspond to the first TCI state of the two TCI states, and other CDM groups to which the DMRS ports belong are indicated to correspond to the second TCI state of the two TCI states; by twelfth indication information in the DCI, the second CDM group to which the DMRS ports allocated for the UE belong is indicated to correspond to the second TCI state of the two TCI states, and other CDM groups to which the DMRS ports belong are indicated to correspond to the first TCI state of the two TCI states; by thirteenth indication information in the DCI, the third CDM group to which the DMRS ports allocated for the UE belong is indicated to correspond to the first TCI state of the two TCI states, and other CDM groups to which the DMRS ports belong are indicated to correspond to the second TCI state of the two TCI states; or by fourteenth indication information in the DCI, the third CDM group to which the DMRS ports allocated for the UE belong is indicated to correspond to the second TCI state of the two TCI states, and other CDM groups to which the DMRS ports belong are indicated to correspond to the first TCI state of the two TCI states.

In one embodiment, the processing device 32 is specifically configured to: if the DMRS ports allocated for the UE conform to the DMRS pilot type 2, and the TCI corresponds to two TCI states, indicate, by the DCI, the corresponding relationship between the CDM group and the TCI states by adopting one of the following manners: by fifteenth indication information in the DCI, if the DMRS ports allocated for the UE belong to one CDM group, the one CDM group is indicated to correspond to the first TCI state of the two TCI states, and if the DMRS ports allocated for the UE belong to at least two CDM groups containing the first CDM group, the first CDM group to which the DMRS ports belong is indicated to correspond to the first TCI state of the two TCI states, and other CDM groups to which the DMRS ports belong are indicated to correspond to the second TCI state of the two TCI states; by sixteenth indication information in the DCI, if the DMRS ports allocated for the UE belong to one CDM group, the one CDM group is indicated to correspond to the second TCI state of the two TCI states, and if the DMRS ports allocated for the UE belong to at least two CDM groups containing the first CDM group, the first CDM group to which the DMRS ports belong is indicated to correspond to the second TCI state of the two TCI states, and other CDM groups to which the DMRS ports belong are indicated to correspond to the first TCI state of the two TCI states; by seventeenth indication information in the DCI, the second CDM group to which the DMRS ports allocated for the UE belong is indicated to correspond to the first TCI state of the two TCI states, and other CDM groups to which the DMRS ports belong are indicated to correspond to the second TCI state of the two TCI states; by eighteenth indication information in the DCI, the second CDM group to which the DMRS ports allocated for the UE belong is indicated to correspond to the second TCI state of the two TCI states, and other CDM groups to which the DMRS ports belong are indicated to correspond to the first TCI state of the two TCI states; by nineteenth indication information in the DCI, the third CDM group to which the DMRS ports allocated for the UE belong is indicated to correspond to the first TCI state of the two TCI states, and other CDM groups to which the DMRS ports belong are indicated to correspond to the second TCI state of the two TCI states; or by twentieth indication information in the DCI, the third CDM group to which the DMRS ports allocated for the UE belong is indicated to correspond to the second TCI state of the two TCI states, and other CDM groups to which the DMRS ports belong are indicated to correspond to the first TCI state of the two TCI states.

Embodiment 3

Based on the same inventive concept, an embodiment of the present application also provides a base station. Since the principle of the above base station solution is similar to the method for indicating TCI, the implementation of the above base station may refer to the implementation of the method, and the repetition will not be repeated.

Figure 4:
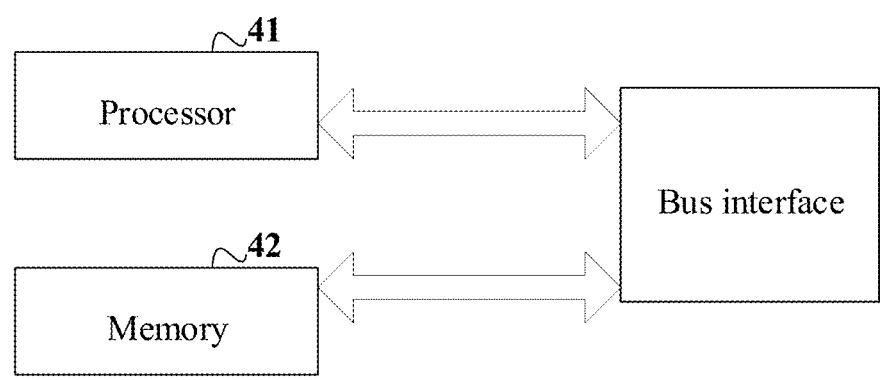
FIG. 4 is a schematic structural diagram of a base station provided by an embodiment of the present application.

FIG. 4 is a schematic structural diagram of a base station provided by an embodiment of the present application. In FIG. 4, a bus architecture may include any quantity of interconnected buses and bridges, specifically, one or more processors represented by a processor 41 and various circuits of a memory represented by a memory 42 are linked together. The bus architecture may also link various other circuits such as peripheral devices, voltage regulators, power management circuits, and the like, which are well known in the art, and therefore, it will not be described further herein. A bus interface provides an interface. The processor 41 is responsible for managing the bus architecture and general processing, and the memory 42 may store data used by the processor 41 in performing operations.

In the base station provided by the embodiment of the present application:
the processor 41 is configured to read a program in the memory 42 and execute:
indicating, by the DCI, a corresponding relationship between a CDM group and the TCI states, when TCI in DCI configured for the UE corresponds to at least two TCI states; where the CDM group is a CDM group to which DMRS ports allocated by the base station for the UE belong.

In one embodiment, the processor 41 is specifically configured to, if the DMRS ports allocated for the UE conform to a DMRS pilot type 1, and the TCI corresponds to two TCI states, indicate, by the DCI, the corresponding relationship between the CDM group and the TCI states by adopting one of the following manners: by first indication information in the DCI, the CDM group to which the DMRS ports allocated for the UE belong is indicated to correspond to a first TCI state of the two TCI states; by second indication information in the DCI, the CDM group to which the DMRS ports allocated for the UE belong is indicated to correspond to a second TCI state of the two TCI states; by third indication information in the DCI, a first CDM group to which the DMRS ports allocated for the UE belong is indicated to correspond to the first TCI state of the two TCI states, and a second CDM group to which the DMRS ports belong is indicated to correspond to the second TCI state of the two TCI states; or by fourth indication information in the DCI, the first CDM group to which the DMRS ports allocated for the UE belong is indicated to correspond to the second TCI state of the two TCI states, and the second CDM group to which the DMRS ports belong is indicated to correspond to the first TCI state of the two TCI states.

In one embodiment, the processor 41 is specifically configured to: if the DMRS ports allocated for the UE conform to the DMRS pilot type 1, and the TCI corresponds to two TCI states, indicate, by the DCI, the corresponding relationship between the CDM group and the TCI states by adopting one of the following manners: by fifth indication information in the DCI, if the DMRS ports allocated for the UE belong to one CDM group, the one CDM group is indicated to correspond to the first TCI state of the two TCI states, and if the DMRS ports allocated for the UE belong to two CDM groups, the first CDM group to which the DMRS ports belong is indicated to correspond to the first TCI state of the two TCI states, and the second CDM group to which the DMRS ports belong is indicated to correspond to the second TCI state of the two TCI states; or by sixth indication information in the DCI, if the DMRS ports allocated for the UE belong to one CDM group, the one CDM group is indicated to correspond to the second TCI state of the two TCI states, and if the DMRS ports allocated for the UE belong to two CDM groups, the first CDM group to which the DMRS ports belong is indicated to correspond to the second TCI state of the two TCI states, and the second CDM group to which the DMRS ports belong is indicated to correspond to the first TCI state of the two TCI states.

In one embodiment, the processor 41 is specifically configured to: if the DMRS ports allocated for the UE conform to a DMRS pilot type 2, and the TCI corresponds to two TCI states, indicate, by the DCI, the corresponding relationship between the CDM group and the TCI states by adopting one of the following manners: by seventh indication information in the DCI, the CDM group to which the DMRS ports allocated for the UE belong is indicated to correspond to the first TCI state of the two TCI states; by eighth indication information in the DCI, the CDM group to which the DMRS ports allocated for the UE belong is indicated to correspond to the second TCI state of the two TCI states; by ninth indication information in the DCI, the first CDM group to which the DMRS ports allocated for the UE belong is indicated to correspond to the first TCI state of the two TCI states, and other CDM groups to which the DMRS ports belong are indicated to correspond to the second TCI state of the two TCI states; by tenth indication information in the DCI, the first CDM group to which the DMRS ports allocated for the UE belong is indicated to correspond to the second TCI state of the two TCI states, and other CDM groups to which the DMRS ports belong are indicated to correspond to the first TCI state of the two TCI states; by eleventh indication information in the DCI, the second CDM group to which the DMRS ports allocated for the UE belong is indicated to correspond to the first TCI state of the two TCI states, and other CDM groups to which the DMRS ports belong are indicated to correspond to the second TCI state of the two TCI states; by twelfth indication information in the DCI, the second CDM group to which the DMRS ports allocated for the UE belong is indicated to correspond to the second TCI state of the two TCI states, and other CDM groups to which the DMRS ports belong are indicated to correspond to the first TCI state of the two TCI states; by thirteenth indication information in the DCI, the third CDM group to which the DMRS ports allocated for the UE belong is indicated to correspond to the first TCI state of the two TCI states, and other CDM groups to which the DMRS ports belong are indicated to correspond to the second TCI state of the two TCI states; or by fourteenth indication information in the DCI, the third CDM group to which the DMRS ports allocated for the UE belong is indicated to correspond to the second TCI state of the two TCI states, and other CDM groups to which the DMRS ports belong are indicated to correspond to the first TCI state of the two TCI states.

In one embodiment, the processor 41 is specifically configured to: if the DMRS ports allocated for the UE conform to the DMRS pilot type 2, and the TCI corresponds to two TCI states, indicate, by the DCI, the corresponding relationship between the CDM group and the TCI states by adopting one of the following manners: by fifteenth indication information in the DCI, if the DMRS ports allocated for the UE belong to one CDM group, the one CDM group is indicated to correspond to the first TCI state of the two TCI states, and if the DMRS ports allocated for the UE belong to at least two CDM groups containing the first CDM group, the first CDM group to which the DMRS ports belong is indicated to correspond to the first TCI state of the two TCI states, and other CDM groups to which the DMRS ports belong are indicated to correspond to the second TCI state of the two TCI states; by sixteenth indication information in the DCI, if the DMRS ports allocated for the UE belong to one CDM group, the one CDM group is indicated to correspond to the second TCI state of the two TCI states, and if the DMRS ports allocated for the UE belong to at least two CDM groups containing the first CDM group, the first CDM group to which the DMRS ports belong is indicated to correspond to the second TCI state of the two TCI states, and other CDM groups to which the DMRS ports belong are indicated to correspond to the first TCI state of the two TCI states; by seventeenth indication information in the DCI, the second CDM group to which the DMRS ports allocated for the UE belong is indicated to correspond to the first TCI state of the two TCI states, and other CDM groups to which the DMRS ports belong are indicated to correspond to the second TCI state of the two TCI states; by eighteenth indication information in the DCI, the second CDM group to which the DMRS ports allocated for the UE belong is indicated to correspond to the second TCI state of the two TCI states, and other CDM groups to which the DMRS ports belong are indicated to correspond to the first TCI state of the two TCI states; by nineteenth indication information in the DCI, the third CDM group to which the DMRS ports allocated for the UE belong is indicated to correspond to the first TCI state of the two TCI states, and other CDM groups to which the DMRS ports belong are indicated to correspond to the second TCI state of the two TCI states; or by twentieth indication information in the DCI, the third CDM group to which the DMRS ports allocated for the UE belong is indicated to correspond to the second TCI state of the two TCI states, and other CDM groups to which the DMRS ports belong are indicated to correspond to the first TCI state of the two TCI states.

On the basis of the above embodiments, an embodiment of the present application further provides a computer readable storage medium, the storage medium stores a computer instruction, and the computer instruction implements the above method for indicating TCI when being executed by a base station.

As for the system/device embodiment, since it is basically similar to the embodiments of the method, the description is relatively simple. For related parts, please refer to the part of the descriptions of the embodiments of the method.

Embodiments of the present application can be provided as a method, system, or computer program product. Thus, the present application can take the form of an entirely hardware embodiment, an entirely software embodiment, or an embodiment combining software and hardware aspects. Moreover, the present application can take the form of a computer program product embodied on one or more computer-usable storage media (including, but not limited to, a magnetic disk storage, CD-ROM, an optical storage, and the like) having computer-usable program code embodied therein.

The present application is described with reference to flowcharts and/or block diagrams of methods, devices (systems), and computer program products according to the embodiments of the present application. It is to be understood that each flow and/or block of the flowcharts and/or block diagrams, and combinations of flows and/or blocks in the flowcharts and/or block diagrams, may be implemented by computer program instructions. These computer program instructions may be provided to a processor of a general purpose computer, special purpose computer, embedded processor, or other programmable data processing device to produce a machine, and the instructions, which execute via the processor of the computer or other programmable data processing device, produce a device for implementing the functions specified in one flow or multiple flows of the flowcharts and/or one block or multiple blocks of the block diagrams.

These computer program instructions may also be stored in a computer-readable memory that can direct a computer or other programmable data processing device to function in a particular manner, and the instructions stored in the computer-readable memory produce an article of manufacture including an instruction device which implements the function specified in the one flow or multiple flows of the flowcharts and/or one block or multiple blocks of the block diagrams.

These computer program instructions may also be loaded onto a computer or other programmable data processing device to cause a series of operational steps to be performed on the computer or other programmable device to produce a computer implemented process and the instructions which execute on the computer or other programmable device provide steps for implementing the functions specified in the one flow or multiple flows of the flowcharts and/or one block or multiple blocks of the block diagrams.

What is claimed is:

1. A method for indicating transmission configuration indication (TCI), applied to a base station, and comprising:
   indicating, by downlink control information (DCI), a corresponding relationship between a code division multiplexing (CDM) group and TCI states, in a case that TCI in the DCI configured for a user equipment (UE) corresponds to at least two TCI states;
   wherein the CDM group is a CDM group to which demodulation reference signal (DMRS) ports allocated by the base station for the UE belong;
   wherein the DMRS ports allocated for the UE conform to a DMRS pilot type 1, and the TCI corresponds to two TCI states, wherein the indicating, by the DCI, the corresponding relationship between the CDM group and the TCI states, comprises one of: indicating, by first indication information in the DCI, that the CDM group to which the DMRS ports allocated for the UE belong corresponds to a first TCI state of the two TCI states; indicating, by second indication information in the DCI, that the CDM group to which the DMRS ports allocated for the UE belong corresponds to a second TCI state of the two TCI states; indicating, by third indication information in the DCI, that a first CDM group to which the DMRS ports allocated for the UE belong corresponds to a first TCI state of the two TCI states, and a second CDM group to which the DMRS ports belong corresponds to a second TCI state of the two TCI states; or indicating, by fourth indication information in the DCI, that a first CDM group to which the DMRS ports allocated for the UE belong corresponds to a second TCI state of the two TCI states, and a second CDM group to which the DMRS ports belong corresponds to a first TCI state of the two TCI states;
   or,
   wherein the DMRS ports allocated for the UE conform to a DMRS pilot type 1, and the TCI corresponds to two TCI states, wherein the indicating, by the DCI, the corresponding relationship between the CDM group and the TCI states, comprises one of: indicating, by fifth indication information in the DCI, that in a case that the DMRS ports allocated for the UE belong to one CDM group, the one CDM group corresponds to a first TCI state of the two TCI states; and in a case that the DMRS ports allocated for the UE belong to two CDM groups, a first CDM group to which the DMRS ports belong corresponds to the first TCI state of the two TCI states, and a second CDM group to which the DMRS ports belong corresponds to a second TCI state of the two TCI states; or indicating, by sixth information in the DCI, that in a case that the DMRS ports allocated for the UE belong to one CDM group, the one CDM group corresponds to a second TCI state of the two TCI states; and in a case that the DMRS ports allocated for the UE belong to two CDM groups, a first CDM group to which the DMRS ports belong corresponds to the second TCI state of the two TCI states, and a second CDM group to which the DMRS ports belong corresponds to a first TCI state of the two TCI states;
   or,
   wherein the DMRS ports allocated for the UE conform to a DMRS pilot type 2, and the TCI corresponds to two TCI states, wherein the indicating, by the DCI, the corresponding relationship between the CDM group and the TCI states, comprises one of: indicating, by seventh indication information in the DCI, that the CDM group to which the DMRS ports allocated for the UE belong corresponds to a first TCI state of the two TCI states; indicating, by eighth indication information in the DCI, that the CDM group to which the DMRS ports allocated for the UE belong corresponds to a second TCI state of the two TCI states; indicating, by ninth indication information in the DCI, that a first CDM group to which the DMRS ports allocated for the UE belong corresponds to a first TCI state of the two TCI states, and other CDM groups to which the DMRS ports belong correspond to a second TCI state of the two TCI states; indicating, by tenth indication information in the DCI, that a first CDM group to which the DMRS ports allocated for the UE belong corresponds to a second TCI state of the two TCI states, and other CDM groups to which the DMRS ports belong correspond to a first TCI state of the two TCI states; indicating, by eleventh indication information in the DCI, that a second CDM group to which the DMRS ports allocated for the UE belong corresponds to a first TCI state of the two TCI states, and other CDM groups to which the DMRS ports belong correspond to a second TCI state of the two TCI states; indicating, by twelfth indication information in the DCI, that a second CDM group to which the DMRS ports allocated for the UE belong corresponds to a second TCI state of the two TCI states, and other CDM groups to which the DMRS ports belong correspond to a first TCI state of the two TCI states; indicating, by thirteenth indication information in the DCI, that a third CDM group to which the DMRS ports allocated for the UE belong corresponds to a first TCI state of the two TCI states, and other CDM groups to which the DMRS ports belong correspond to a second TCI state of the two TCI states; or indicating, by fourteenth indication information in the DCI, that a third CDM group to which the DMRS ports allocated for the UE belong corresponds to a second TCI state of the two TCI states, and other CDM groups to which the DMRS ports belong correspond to a first TCI state of the two TCI states;
   or,
   wherein the DMRS ports allocated for the UE conform to a DMRS pilot type 2, and the TCI corresponds to two TCI states, wherein the indicating, by the DCI, the corresponding relationship between the CDM group and the TCI states, comprises one of: indicating, by fifteenth indication information in the DCI, that in a case that the DMRS ports allocated for the UE belong to one CDM group, the one CDM group corresponds to a first TCI state of the two TCI states; and in a case that the DMRS ports allocated for the UE belong to at least two CDM groups comprising a first CDM group, the first CDM group to which the DMRS ports belong corresponds to the first TCI state of the two TCI states, and other CDM groups to which the DMRS ports belong correspond to a second TCI state of the two TCI states; indicating, by sixteenth indication information in the DCI, that in a case that the DMRS ports allocated for the UE belong to one CDM group, the one CDM group corresponds to a second TCI state of the two TCI states; and in a case that the DMRS ports allocated for the UE belong to at least two CDM groups comprising a first CDM group, the first CDM group to which the DMRS ports belong corresponds to the second TCI state of the two TCI states, and other CDM groups to which the DMRS ports belong correspond to a first TCI state of the two TCI states; indicating, by seventeenth indication information in the DCI, that a second CDM group to which the DMRS ports allocated for the UE belong corresponds to a first TCI state of the two TCI states, and other CDM groups to which the DMRS ports belong correspond to a second TCI state of the two TCI states; indicating, by eighteenth indication information in the DCI, that a second CDM group to which the DMRS ports allocated for the UE belong corresponds to a second TCI state of the two TCI states, and other CDM groups to which the DMRS ports belong correspond to a first TCI state of the two TCI states; indicating, by nineteenth indication information in the DCI, that a third CDM group to which the DMRS ports allocated for the UE belong corresponds to a first TCI state of the two TCI states, and other CDM groups to which the DMRS ports belong correspond to a second TCI state of the two TCI states; or indicating, by twentieth indication information in the DCI, that a third CDM group to which the DMRS ports allocated for the UE belong corresponds to a second TCI state of the two TCI states, and other CDM groups to which the DMRS ports belong correspond to a first TCI state of the two TCI states.

2. A base station, comprising:
a processor; and
a memory; wherein the memory is configured to store a program executable by the processor, and the processor is configured to read the program in the memory and execute:
indicating, by downlink control information (DCI), a corresponding relationship between a code division multiplexing (CDM) group and TCI states, in a case that TCI in the DCI configured for a user equipment (UE) corresponds to at least two TCI states;
wherein the CDM group is a CDM group to which demodulation reference signal (DMRS) ports allocated by the base station for the UE belong;
wherein the DMRS ports allocated for the UE conform to a DMRS pilot type 1, and the TCI corresponds to two TCI states, wherein the processor is specifically configured to: indicate, by the DCI, the corresponding relationship between the CDM group and the TCI states by adopting one of: indicating, by first indication information in the DCI, that the CDM group to which the DMRS ports allocated for the UE belong corresponds to a first TCI state of the two TCI states; indicating, by second indication information in the DCI, that the CDM group to which the DMRS ports allocated for the UE belong corresponds to a second TCI state of the two TCI states; indicating, by third indication information in the DCI, that a first CDM group to which the DMRS ports allocated for the UE belong corresponds to a first TCI state of the two TCI states, and a second CDM group to which the DMRS ports belong corresponds to a second TCI state of the two TCI states; or indicating, by fourth indication information in the DCI, that a first CDM group to which the DMRS ports allocated for the UE belong corresponds to a second TCI state of the two TCI states, and a second CDM group to which the DMRS ports belong corresponds to a first TCI state of the two TCI states;

or,
wherein the DMRS ports allocated for the UE conform to a DMRS pilot type 1, and the TCI corresponds to two TCI states, wherein the processor is specifically configured to: indicate, by the DCI, the corresponding relationship between the CDM group and the TCI states by adopting one of: indicating, by fifth indication information in the DCI, that in a case that the DMRS ports allocated for the UE belong to one CDM group, the one CDM group corresponds to a first TCI state of the two TCI states; and in a case that the DMRS ports allocated for the UE belong to two CDM groups, a first CDM group to which the DMRS ports belong corresponds to the first TCI state of the two TCI states, and a second CDM group to which the DMRS ports belong corresponds to a second TCI state of the two TCI states; or indicating, by sixth indication information in the DCI, that in a case that the DMRS ports allocated for the UE belong to one CDM group, the one CDM group corresponds to a second TCI state of the two TCI states, and in a case that the DMRS ports allocated for the UE belong to two CDM groups, a first CDM group to which the DMRS ports belong corresponds to the second TCI state of the two TCI states, and a second CDM group to which the DMRS ports belong corresponds to a first TCI state of the two TCI states;

or,
wherein the DMRS ports allocated for the UE conform to a DMRS pilot type 2, and the TCI corresponds to two TCI states, wherein the processor is specifically configured to: indicate, by the DCI, the corresponding relationship between the CDM group and the TCI states by adopting one of: indicating, by seventh indication information in the DCI, that the CDM group to which the DMRS ports allocated for the UE belong corresponds to a first TCI state of the two TCI states; indicating, by eighth indication information in the DCI, that the CDM group to which the DMRS ports allocated for the UE belong corresponds to a second TCI state of the two TCI states; indicating, by ninth indication information in the DCI, that a first CDM group to which the DMRS ports allocated for the UE belong corresponds to a first TCI state of the two TCI states, and other CDM groups to which the DMRS ports belong correspond to a second TCI state of the two TCI states; indicating, by tenth indication information in the DCI, that a first CDM group to which the DMRS ports allocated for the UE belong corresponds to a second TCI state of the two TCI states, and other CDM groups to which the DMRS ports belong correspond to a first TCI state of the two TCI states; indicating, by eleventh indication information in the DCI, that a second CDM group to which the DMRS ports allocated for the UE belong corresponds to a first TCI state of the two TCI states, and other CDM groups to which the DMRS ports belong correspond to a second TCI state of the two TCI states; indicating, by twelfth indication information in the DCI, that a second CDM group to which the DMRS ports allocated for the UE belong corresponds to a second TCI state of the two TCI states, and other CDM groups to which the DMRS ports belong correspond to a first TCI state of the two TCI states;

indicating, by thirteenth indication information in the DCI, that a third CDM group to which the DMRS ports allocated for the UE belong corresponds to a first TCI state of the two TCI states, and other CDM groups to which the DMRS ports belong correspond to a second TCI state of the two TCI states; or indicating, by fourteenth indication information in the DCI, that a third CDM group to which the DMRS ports allocated for the UE belong corresponds to a second TCI state of the two TCI states, and other CDM groups to which the DMRS ports belong correspond to a first TCI state of the two TCI states;

or, wherein the DMRS ports allocated for the UE conform to a DMRS pilot type 2, and the TCI corresponds to two TCI states, wherein the processor is specifically configured to: indicate, by the DCI, the corresponding relationship between the CDM group and the TCI states by adopting one of: indicating, by fifteenth indication information in the DCI, that in a case that the DMRS ports allocated for the UE belong to one CDM group, the one CDM group corresponds to a first TCI state of the two TCI states; and in a case that the DMRS ports allocated for the UE belong to at least two CDM groups comprising a first CDM group, the first CDM group to which the DMRS ports belong corresponds to the first TCI state of the two TCI states, and other CDM groups to which the DMRS ports belong correspond to a second TCI state of the two TCI states; indicating, by sixteenth indication information in the DCI, that in a case that the DMRS ports allocated for the UE belong to one CDM group, the one CDM group corresponds to a second TCI state of the two TCI states; and in a case that the DMRS ports allocated for the UE belong to at least two CDM groups comprising a first CDM group, the first CDM group to which the DMRS ports belong corresponds to the second TCI state of the two TCI states, and other CDM groups to which the DMRS ports belong correspond to a first TCI state of the two TCI states; indicating, by seventeenth indication information in the DCI, that a second CDM group to which the DMRS ports allocated for the UE belong corresponds to a first TCI state of the two TCI states, and other CDM groups to which the DMRS ports belong correspond to a second TCI state of the two TCI states; indicating, by eighteenth indication information in the DCI, that a second CDM group to which the DMRS ports allocated for the UE belong corresponds to a second TCI state of the two TCI states, and other CDM groups to which the DMRS ports belong correspond to a first TCI state of the two TCI states; indicating, by nineteenth indication information in the DCI, that a third CDM group to which the DMRS ports allocated for the UE belong corresponds to a first TCI state of the two TCI states, and other CDM groups to which the DMRS ports belong correspond to a second TCI state of the two TCI states; or indicating, by twentieth indication information in the DCI, that a third CDM group to which the DMRS ports allocated for the UE belong corresponds to a second TCI state of the two TCI states, and other CDM groups to which the DMRS ports belong correspond to a first TCI state of the two TCI states.

3. A non-transitory computer readable storage medium, wherein the storage medium stores a computer instruction, and the computer instruction implements the method according to claim 1 when being executed by a processor of the base station.

\* \* \* \* \*